United States Patent [19]
Olarig

[11] Patent Number: 6,021,466
[45] Date of Patent: Feb. 1, 2000

[54] TRANSFERRING DATA BETWEEN CACHES IN A MULTIPLE PROCESSOR ENVIRONMENT

[75] Inventor: Sompong P. Olarig, Cypress, Tex.

[73] Assignee: Compaq Computer Corporation, Houston, Tex.

[21] Appl. No.: 08/615,401

[22] Filed: Mar. 14, 1996

[51] Int. Cl.[7] .................................................. G06F 12/08
[52] U.S. Cl. ..................... 711/122; 711/119; 711/124; 711/130
[58] Field of Search ..................................... 395/446, 468, 395/473, 472, 449, 471, 470; 711/119, 144, 146, 145, 122, 143

[56] References Cited

U.S. PATENT DOCUMENTS

| | | | |
|---|---|---|---|
| 3,848,234 | 11/1974 | MacDonald | 395/446 |
| 4,141,067 | 2/1979 | McLagan | 395/468 |
| 4,843,542 | 6/1989 | Dashiell et al. | 395/446 |
| 4,939,641 | 7/1990 | Schwartz et al. | 395/473 |
| 5,097,409 | 3/1992 | Schwartz et al. | 395/472 |
| 5,241,641 | 8/1993 | Iwasa et al. | 395/449 |
| 5,283,886 | 2/1994 | Nishir et al. | 395/471 |
| 5,530,832 | 6/1996 | So et al. | 395/449 |
| 5,555,398 | 9/1996 | Raman | 395/470 |

OTHER PUBLICATIONS

Pentium Processor Family User's Manual, vol. I: Pentium Processor Family Data Book, Copyright 1994. Chapter 18, pp. 18–1—18–18 and Chapter 20, pp. 20–1—20–31. Applicant is aware of multiprocessor cache systems in which write backs from one processor's cache to another processor's cache is made through the main memory.

*Primary Examiner*—Tod R. Swann
*Assistant Examiner*—Fred F. Tzeng

[57] ABSTRACT

A cache system for multiple processors including multiple caches, one of the caches serving each respective processor, a main memory system, and a bus interconnecting the caches and the main memory, the bus allowing data to be written directly between the caches without accessing the main memory system.

23 Claims, 7 Drawing Sheets

6,021,466

TRANSFERRING DATA BETWEEN CACHES IN A MULTIPLE PROCESSOR ENVIRONMENT

BACKGROUND

This invention relates to caching data.

Caches improve the performance of microprocessors by storing copies of data that would otherwise be subject to frequent accesses from main memory. Because changes to the data in the cache are not immediately copied back to main memory, the version of data kept in main memory may not be correct. Because a cache typically uses memory chips that have faster access times than those used in main memory, a microprocessor can read and write data in its cache faster than in its main memory. Fast access cache memory chips cost more than slower access main memory chips and so a cache is typically smaller than main memory. Only a portion of the main memory data can reside in the cache at one time. Caches have circuitry to transfer data back and forth from main memory depending on which data the microprocessor is accessing. When data which the microprocessor needs to read or write is not in its cache, the cache decides whether to copy the data from main memory to the cache. Whole groups of contiguous words, known as "lines", are copied at one time into the cache. When the cache is full, lines being copied overwrite old lines.

Cache management is more complicated in multiprocessor systems in which, for example, one microprocessor runs a word processing system while another runs a data base, or two microprocessors run different tasks of a single data base program. Both processors may seek to access the same location in main memory, creating a conflict between the processors' caches.

In the known system illustrated in FIG. 1, the two processors CPU A 10 and CPU B 12 share a common level 2 cache 22. CPU A 10 and CPU B 12 are connected to a common host bus 14 by which they communicate with a cache/memory controller 16. The cache/memory controller manages access to main memory 18 by CPU A and CPU B and by other devices via a PCI bus 20. Each CPU has its own level 1 cache (not shown) which is typically on the same chip as the CPU and is not shared with the other CPU. CPU A and CPU B resolve ownership of the host bus via bus arbitration signals 24. Those same signals are used to resolve conflicts involving the level 1 caches in the two CPUs.

A typical known cache, shown in FIG. 2, has a cache memory 30 holding lines of data 32a–k, each including two or more words 34a–e. The number of lines in the cache and the number of words per line varies from cache to cache.

The typical known cache also includes a tag ram 36, which contains an address 38a–k and a status 40a–k for each line in the cache. Each address is an address in main memory corresponding to the data in the corresponding line in the cache. For example, address 38a may be the main memory address corresponding to the data in line 32a.

The status indicates the validity of the data in the corresponding line. For example, status 40a may contain the status for line 32a. Each status can have one of four values: (1) "modify", which means that a CPU has modified one or more words in the corresponding line, leaving the data in main memory corresponding to that line "stale"; (2) "exclusive", which means that the data is available in only one cache and it is not modified; (3) "shared", which means that the data in the corresponding line is potentially shared with other caches in the system; and (4) "invalid", which means that the data in the corresponding line of the cache is invalid.

Because each CPU has its own cache, the possibility exists for conflict between the caches such as, for example, if CPU B changes data in its cache without changing main memory and CPU A attempts to read the same data from main memory into its cache. Unless the CPUs resolve this conflict, i.e. as shown in FIG. 3 for a known system, CPU A will process stale data. Assume CPU A has control of the host bus, i.e. is the "host master", so CPU A attempts to read from its level 1 cache. CPU A experiences a "read miss", meaning that its level 1 cache does not contain a line corresponding to the address sought to be accessed 52. CPU A tries to read the corresponding line of data from the level 2 cache or from main memory 56 and notifies CPU B of the impending read via the bus arbitration signals. CPU B detects that its level 1 cache contains the line CPU A is about to read and that the status of the line is "modify" which means that the data CPU A is attempting to read from the level 2 cache or main memory is stale. This is called a "hit on modify." CPU B notifies CPU A that the read is to a data line with stale data 58. CPU A completes the read from the level 2 cache or main memory through the cache/memory controller and discards the stale data 60. CPU A transfers control of the host bus to CPU B 62. CPU B writes the modified line to main memory through the cache/memory controller and changes the status of the modified line to "shared" 64. CPU A transfers control of the host memory back to CPU A 66. CPU A reads a line of data into its L1 cache from main memory through the cache/memory controller 68. CPU A then completes the read from its level 1 cache 70. CPU A and B change the status of the line in their L1 caches to "shared."

A similar sequence occurs if CPU A experiences a write miss to its L1 cache 72. The operation follows the same logic described above for steps 56, 58, 60, 62, 64, 66 and 68, except that in step 64 CPU B changes the status of the requested line in its L1 cache to "invalid" because it knows CPU A is about to write to that line. After CPU A reads the line of data into its L1 cache from main memory, it performs the write to its L1 cache and changes the status of the line in its L1 cache to "modified" 74.

SUMMARY

In general, in one aspect, the invention features a cache system for multiple processors comprising multiple caches, one of the caches serving each respective processor, a main memory system, and a bus interconnecting the caches and the main memory system, the bus allowing data to be written directly between the caches without accessing the main memory system.

Implementations of the invention may include one or more of the following. The caches may be level two caches and the cache system may further comprise multiple level one caches, one of the level one caches serving each respective processor. The cache system may further comprise snoop signals connecting the multiple caches.

In general, in another aspect, the invention features a method for performing an allocation cycle to a cache comprising accessing a main memory system only once.

Implementations of the invention may include one or more of the following. The method may further comprise a first cache controller informing a second cache controller of the allocation cycle, and the second cache controller informing the first cache controller that the allocation cycle is accessing a stale item of data from the main memory system. The method may further comprise the first cache controller discarding the stale item of data retrieved from main memory. The method may further comprise a first cache controller writing an item of data from a first cache memory to a second cache memory. The method may further comprise a second cache controller intercepting the item of data as it is being written into the second cache memory.

In general, in another aspect, the invention features a cache system comprising a cache memory, a main memory system, a bus connected to the cache memory and the main memory system, a first cache controller connected to the cache memory and to the bus, the first cache controller controlling access to the cache memory, and a second cache controller capable of writing data into the cache memory via the bus without accessing the main memory system.

Implementations of the invention may include one or more of the following. The cache system may further comprise a plurality of snoop signals connecting the first cache controller to the second cache controllers. The cache system may further comprise a first processor connected to the first cache controller, and a second processor connected to the second cache controller. The cache system may further comprise a first level one cache serving the first processor, and a second level one cache serving the second processors.

In general, in another aspect, the invention features a cache system having two cache controllers connected by snoop signal lines.

Implementations of the invention may include one or more of the following. The cache system may further comprise a bus interconnecting the first cache controller and the second cache controller. The cache system may further comprise a first cache memory, access to which is controlled by the first cache controller, and a second cache memory, access to which is controlled by the second cache controller. The cache system may further comprise a bus interconnecting the first and second cache controllers and the first and second cache memories. The cache system may further comprise a main memory system. The first cache controller may be capable of moving an item of data between the first cache memory and the second cache memory without accessing the main memory system. The second cache controller may be capable of intercepting the data as it is moved between the first cache memory and the second cache memory.

In general, in another aspect, the invention features a cache system comprising multiple processors, multiple caches, one of the caches serving each respective processor, a main memory system, and a bus interconnecting the multiple caches and the main memory system wherein an item of data may be written from one of the caches to another without accessing main memory system.

In general, in another aspect, the invention features a computer system, comprising multiple processors, multiple caches one of the caches serving each respective processor, a main memory system, a first bus interconnecting the caches and the main memory system, the first bus allowing data to be written directly between the caches without accessing the main memory system, and a second bus connected to the main memory system.

Implementations of the invention may include one or more of the following. The computer system may further comprise peripheral devices connected to the second bus. The peripheral devices may be able to access the main memory system while an item of data is being written between the caches.

In general, in another aspect, the invention features in a multiple cache system a method for writing data between the caches without accessing a main memory system.

In general, in another aspect, the invention features a cache system wherein an allocation cycle to a cache requires only one access to a main memory system.

In general, in another aspect, the invention features a method for performing an allocation cycle to a cache comprising a first cache controller informing a second cache controller of the allocation cycle, the second cache controller informing the first cache controller that the allocation cycle is accessing a stale item of data from a main memory system, the first cache controller discarding the stale item of data retrieved from main memory, the first cache controller writing an item of data from a first cache memory to a second cache memory, and the second cache controller intercepting the item of data as it is being written into the second cache memory.

Advantages of the invention may include one or more of the following.

The invention may improve performance by reducing the number of read and write cycles to main memory associated with resolving cache conflicts, thus freeing the main memory for accesses from other devices. The invention separates the function of controlling main memory from the function of controlling the level 2 caches, which may allow the memory controller design to be more closely conformed to the function of controlling main memory.

Other advantages or features will become apparent from the following description and from the claims.

DESCRIPTION

Figure 5:
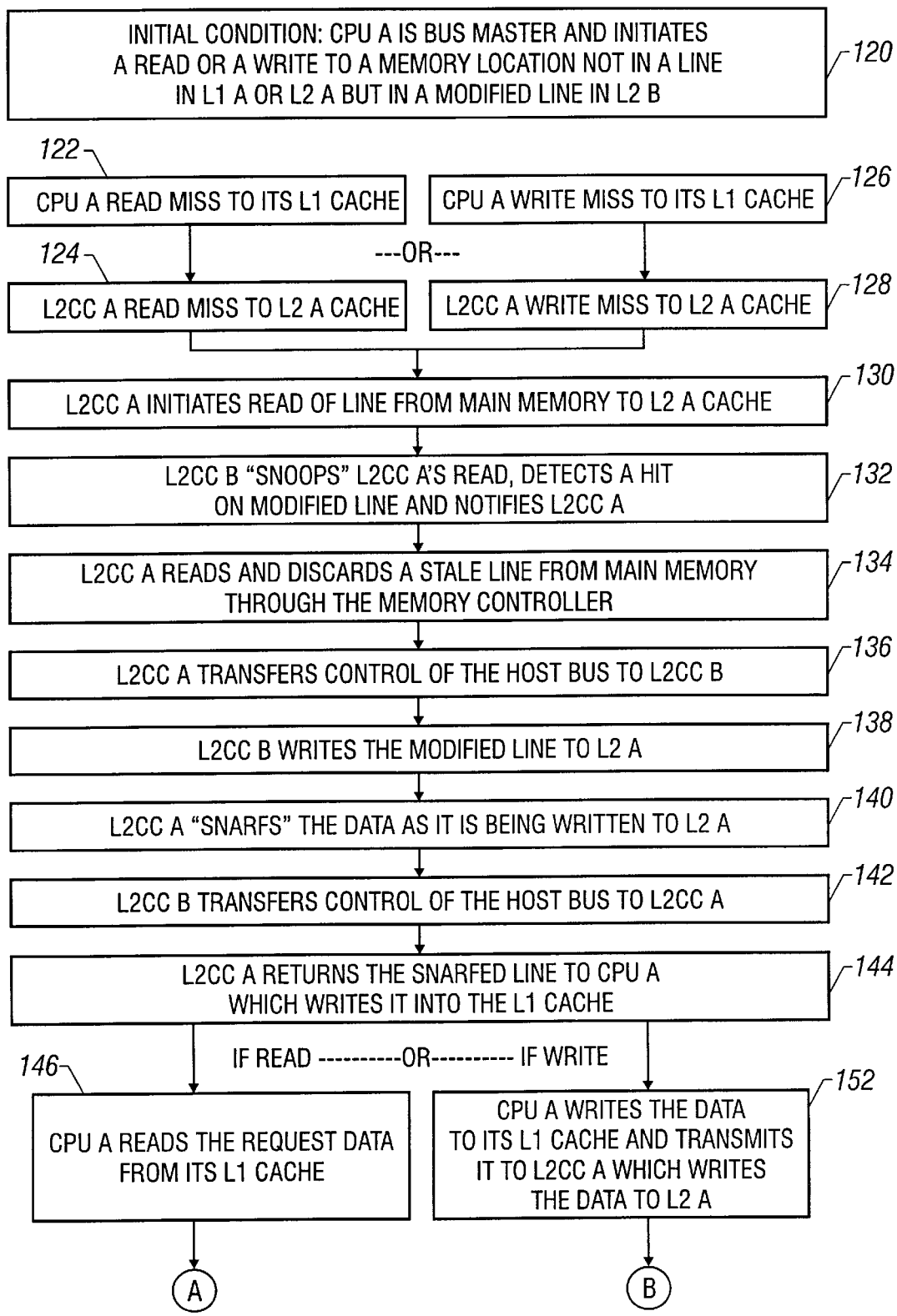
Figure 5A:
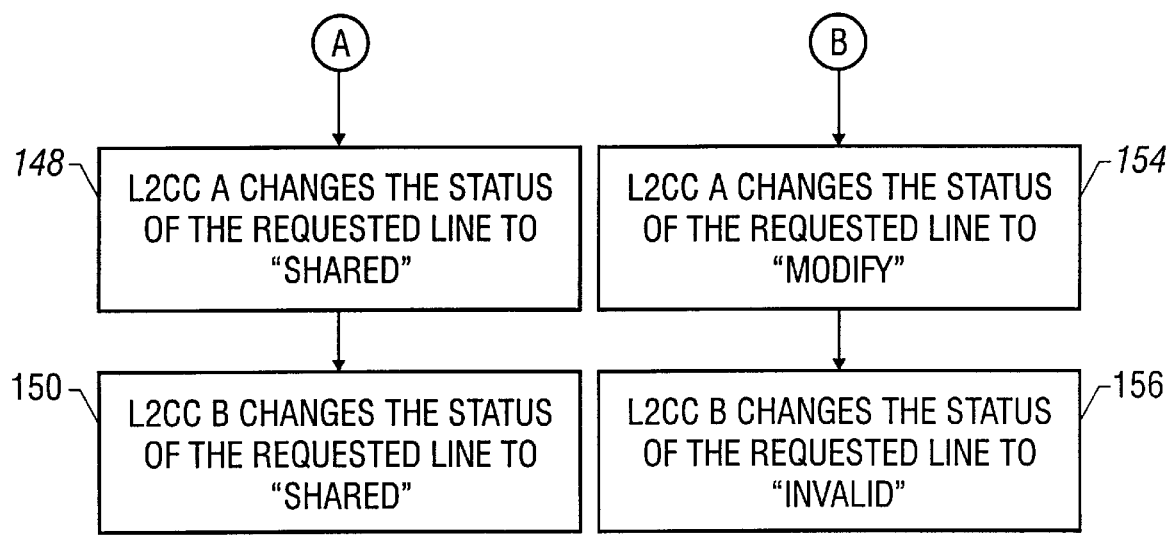
Figure 6:
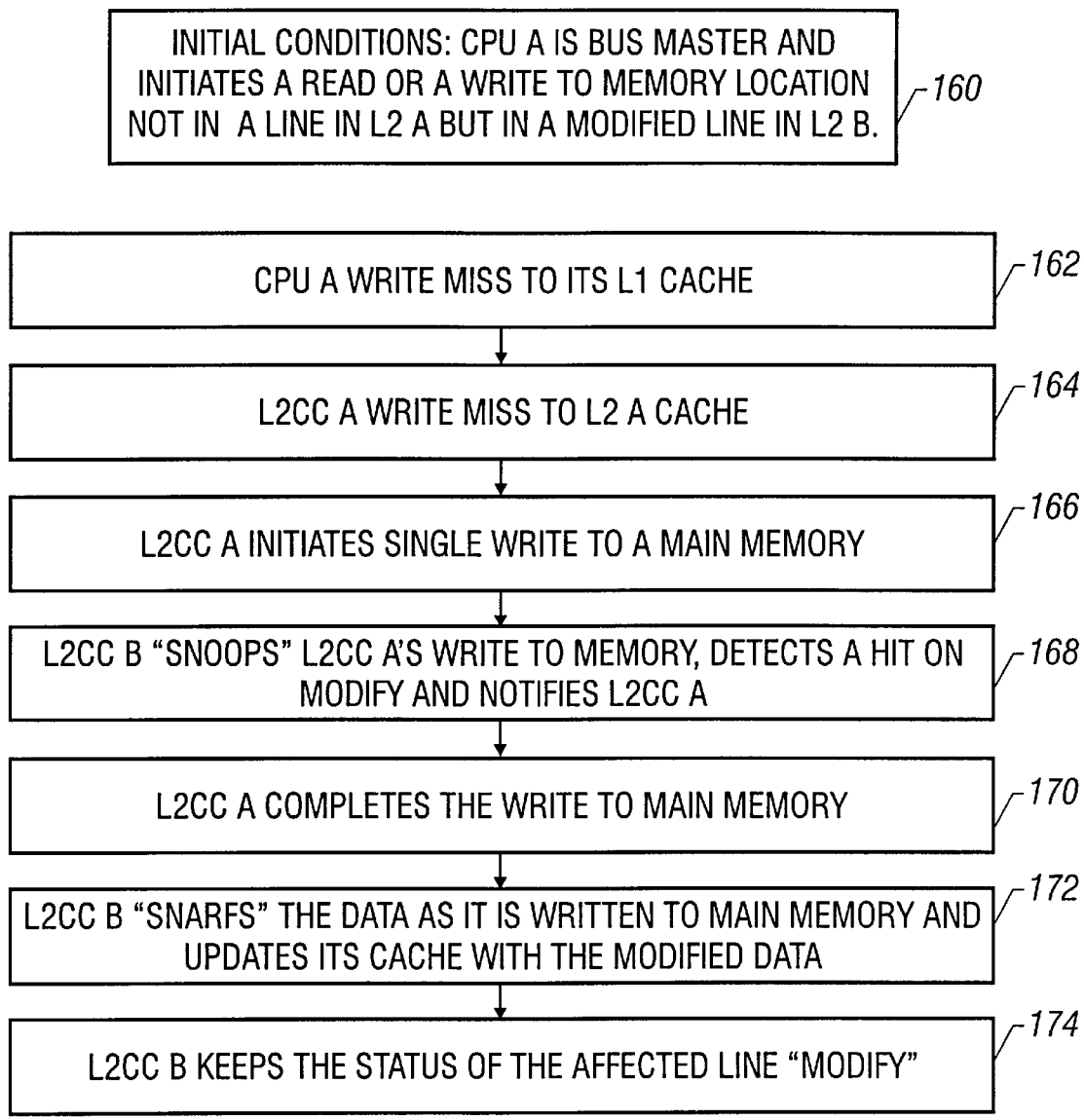

FIGS. 5, 5A, and 6 are flow charts.

Figure 1:
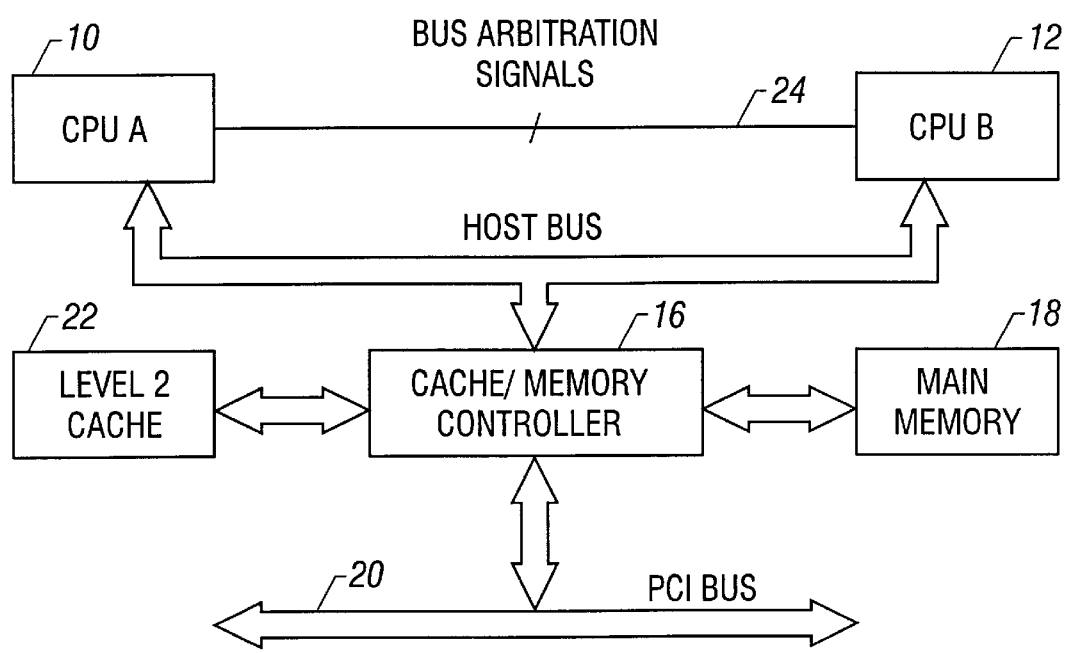
FIG. 1 is a block diagrams of a known multiprocessor system.
Figure 2:
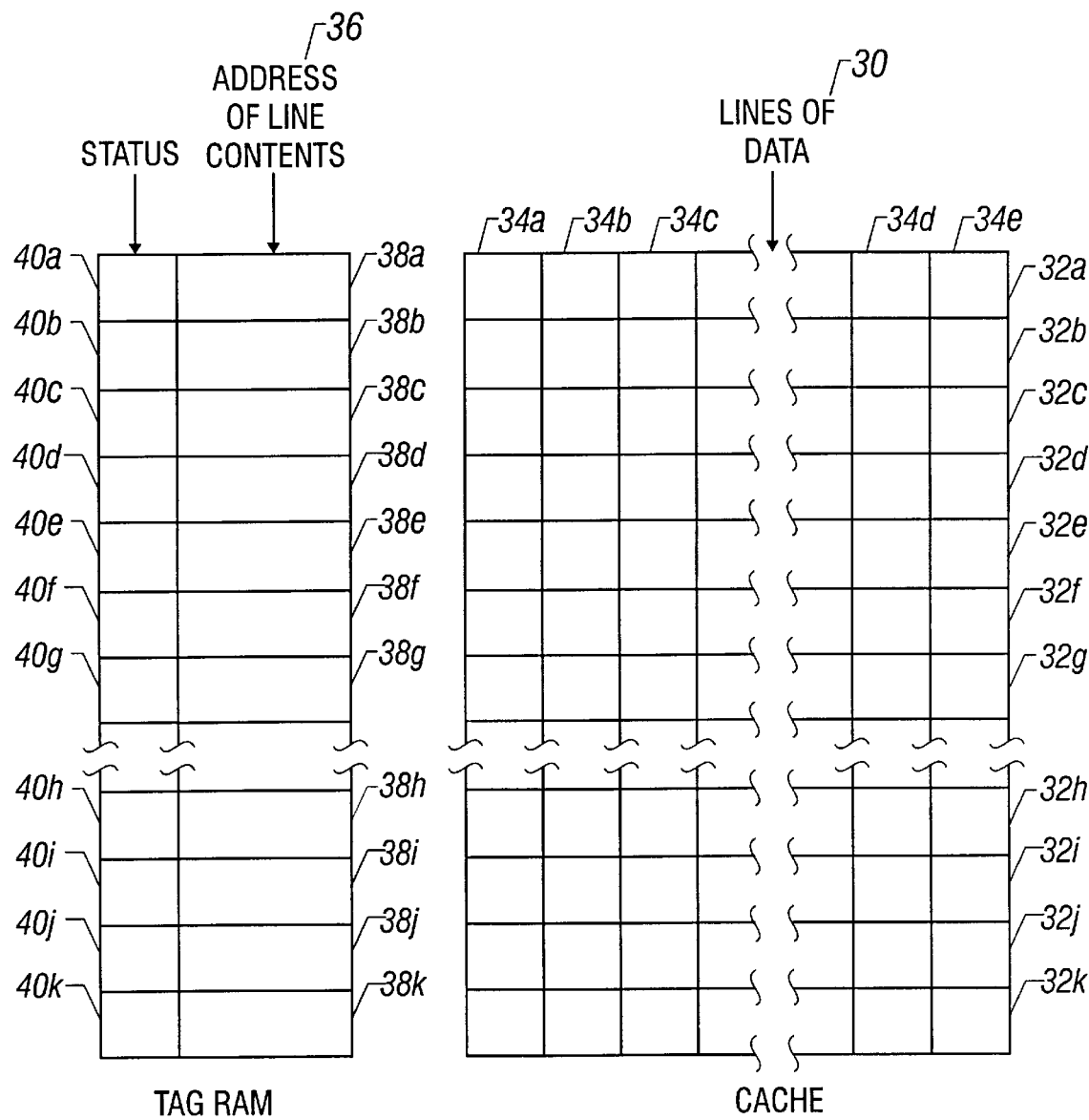
FIG. 2 is a block diagram of a known cache.
Figure 3:
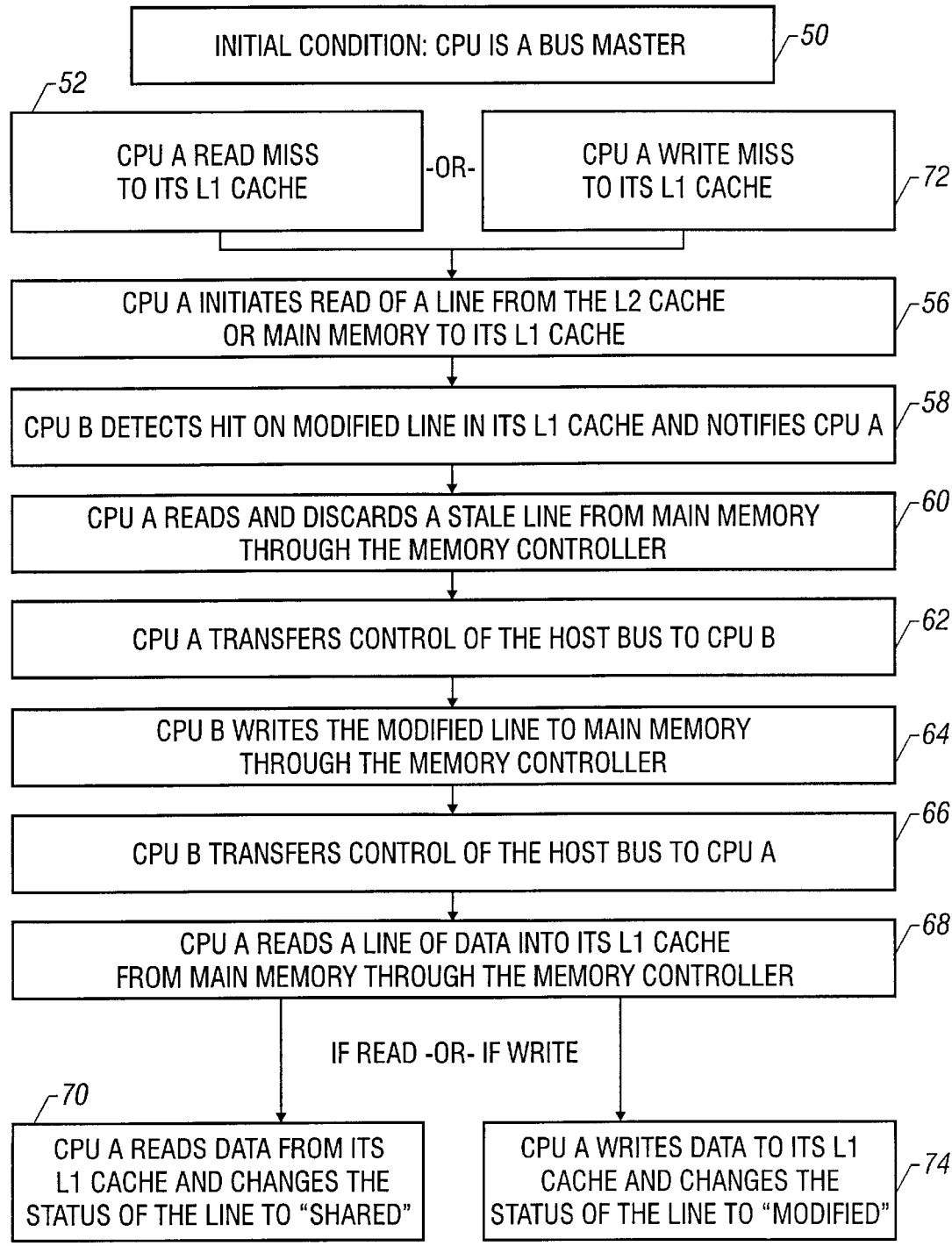
FIG. 3 is a flow chart of the operation of the system of FIG. 1.
Figure 4:
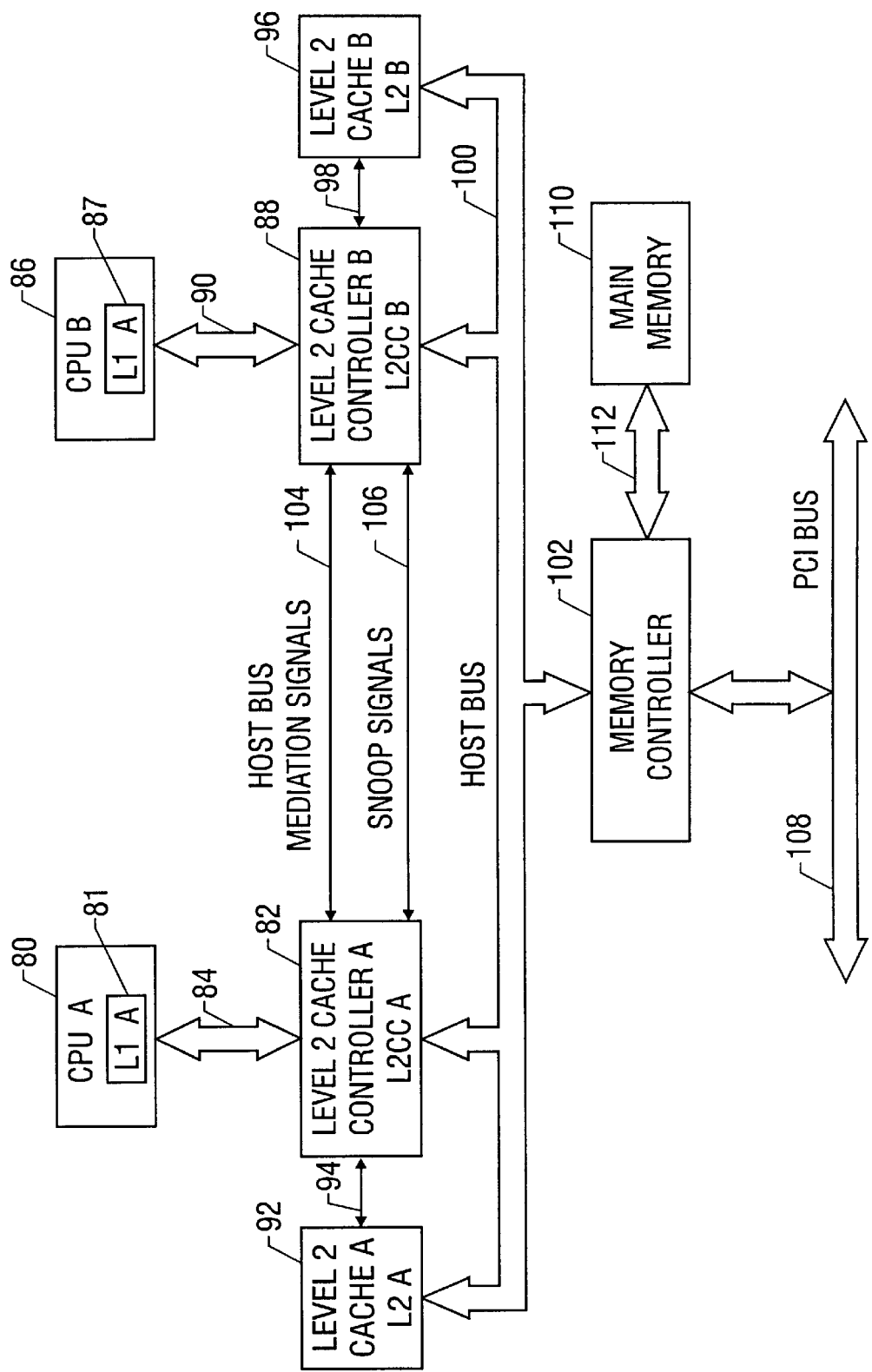
FIG. 4 is a block diagram of an embodiment of a new multi-processor system

In FIG. 4, CPU A, 80, which has a level 1 cache A ("L1 A") 81, communicates with a level 2 cache controller A ("L2CC A") 82 via a dedicated bus 84. A CPU B, 86, which has a level 1 cache B ("L1 B") 87, communicates with a level 2 cache controller B ("L2CC B") 88 via a dedicated bus 90. L2CC A communicates with a level 2 cache A, 92, ("L2 A") via cache control signals A, 94. L2CC B communicates with a level 2 cache B, 96, ("L2 B") via cache control signals B, 98. L2CC A, L2CC B, L2 A, and L2 B share access to a host bus 100 with a memory controller 102, separate from the two level 2 cache controllers. The L2CC A communicates with the L2CC B via host bus mediation signals 104, by which L2CC A and L2CC B determine which processor has control over the host bus, and via snoop signals 106, by which each level 2 cache controller monitors ("snoops") the reads and writes of the other. The memory controller allows devices connected to a PCI bus 108 or the host bus to access a main memory 110 via a dedicated bus 112.

When a level 2 cache controller, e.g. L2CC A, receives a read or write request from a CPU, e.g. CPU A, it determines whether the data is to be accessed is in its cache memory, e.g. L2 A. If not, L2CC A decides, through one of a number of known algorithms, whether a line including the data to be accessed should be copied from main memory to L2 A in operations called "read allocation" or "write allocation" cycles, or if the data should be simply accessed in main memory without reading it into L2 A, called a "single write"

cycle. If a read or write allocation cycle occurs in L2CC A and the data in main memory is stale but is fresh in L2 B, the invention transfers the data from L2 B to L2 A without writing it to main memory.

Initially, as illustrated in FIGS. 5 and 5A, CPU A is the bus master and CPU B is the non-bus-master. CPU A initiates a read or a write to a main memory location not stored in a line in either L1 A or L2 A, but which is stored in a modified line in L2 B, 120. If CPU A initiates a read (or write), it will have a read (or write) miss to L1 A, 122 (128), because L1 A does not contain the data. CPU A will initiate a read (write) to L2CC A which will have a read (write) miss to L2 A, 124 (128), because L2 A does not contain the data.

In either case (read or write), L2CC A must retrieve the needed line of data. L2CC A initiates a read of the required line from main memory through the memory controller 130. L2CC B snoops the address of L2CC A's read through snoop signals, detects a hit on modify by finding L2CC A's read in its tag ram with a "modify" status, and notifies L2CC A of the hit on modify via a return snoop signal 132. L2CC A either reads and discards the stale line from main memory or terminates the read from main memory as soon as L2CC B sends its notification of the hit on modify. In either case, L2CC A transfers control of the host bus to L2CC B using the host bus mediation signals 136. L2CC B writes the modified line directly to L2 A via the host bus 138. L2CC A "snarfs", or intercepts but without disrupting the transfer, the transferred data as it is being written to L2 A, 140. L2CC B transfers control of the host bus back to L2CC A using the host bus mediation signals 142. L2CC A returns the "snarfed" line to CPU A which writes it into L1 A, 144.

If CPU A's original request was a read, CPU A reads the requested data from its L1 cache 146. L2CC A and L2CC B both change the status of the requested line to "shared" 148, 150, FIG. 5A.

If CPU A's original request was a write, CPU A writes the data to L1 A and sends the data to L2CC A which writes it to L2 A, 152, FIG. 5. L2CC A changes the status of the requested line to "modify" 154 and L2CC B invalidates the requested (modified) line 156, FIG. 5A.

A read allocation or write allocation cycle with a hit on modify in the non-bus-master's cache requires at most one access to main memory through the memory controller, which keeps the memory controller free for accesses to main memory via the PCI bus.

In a single write to memory, illustrated in FIG. 6, the writing CPU does not attempt to update its cache, unlike an allocate cycle. Initially CPU A is the bus master initiating a write to a location in memory which is present in a line in L2 B having a "modify" status. CPU A has a write miss to L1 A, 162, and initiates a write to L2CC A. L2CC A has a write miss to L2 A cache 164. L2CC A initiates a single write, rather than a write allocation cycle, to main memory 166. L2CC B snoops L2CC A's write to memory via the snoop signals, detects the address of the write in its tag ram in a line with a "modify" status, and notifies L2CC A of the hit on modify 168. L2CC A completes the write to main memory 170. L2CC B "snarfs", or intercepts but without disrupting the transfer, the data as it is written to main memory and updates L2 B with the modified data 172. L2CC B keeps the status of the affected line "modify" 174.

A detailed description of an embodiment is contained in Appendices A and B. incorporated by reference. The Appendices describe an L2C chip and an L2D chip which together make up an embodiment of the invention.

Other embodiments are within the scope of the following claims.

For example, the system may be composed of more than two processors.

APPENDIX A

1. Introduction

1.1. System Overview

The L2 Cache controller (L2C) is used with one L2 Data management ASIC to support various Pentium-compatible processors for use in a plug-in CPU upgrade card containing dual Pentium processors. The L2D is a data management chip that works as a companion chip. These two ASICs form a highly integrated and cost effective secondary cache solution.

The L2C/L2D chip set supports processors running at 50 MHz. with zero wait-state cache way prediction hit and one wait-state cache way prediction miss. In addition, it also supports processors running at 60 MHz. with one wait-state cache hit. The L2C/L2D will support a limited number of L2 cache configurations depending on the selected cache size. The L2 cache is a 512KB cache configured as 2-way set associative, depending on the depth and number of cache RAMs used.

1.2. Design Overview

The design goals of the L2C/L2D chip set are to provide a very cost effective secondary cache solution with optimum performance for dual-processor mainstream servers and can support a wide range of current and next-generation Pentium-compatible microprocessors.

1.2.1 Main Features

The L2C/L2D will support only a handful of options or modes to minimize the risk factors, development time and engineering resources. The L2C/L2D have the following main features:

- Large cache size support:
  - 512 KB
  - 4K internal tags
  - 4 lines per sector
  - 4 bus transaction per line

- Write-back cache design with full multiprocessing consistency support:
  - supports MSI protocol
  - monitors host bus to ensure cache consistency
  - maintains consistency with L1 caches
  - supports write-allocation
  - supports caching CPU locked cycles

- Two way-set associative cache (no direct-mapped) with way prediction and replacement algorithm

- Zero-wait-state read hit on way prediction hit, one wait-state read hit on way prediction miss

- One-wait-state operation on CPU bus @ 60 MHz.

- Host bus will operate at 1X of CPU bus frequency

- Supports 32 byte line size

- Supports cache-to-cache transfers (bus snarfing)

- Supports invisible snoop cycles to minimize the host bus utilization rate and memory latency

1.3. Architectural Overview

The L2C/L2D chip set is designed to operate at 1X of CPU bus frequency and directly interface with the Pentium bus.

The L2C is the main control unit for the chip set. The L2C handles all CPU request traffic including requests for host bus access. The L2C contains tags, line states and determines cache hits and misses. The L2C controls the data paths for cache hits and misses to provide the CPU with the proper requested data. The L2C is also responsible for performing CPU and host bus snoop operations while other bus master devices, such as other CPU or PCI bus masters, are accessing the memory subsystem.

The L2C has four major functional interfaces; Processor / L2 Cache Control (PCON), Hostbus Control (HCON), Queue Control (QCON) and Configuration and Memory Attributes Programming (CMAP) block. The first two control blocks operate independent of the others. Cycles are passed between the PCON and HCON blocks via the QCON block by using queues and request registers. The QCON also controls the data flow of these queues between the PCON and HCON.

The HCON consists of three major subblocks; host bus control or state machine, host bus arbiter and dual-processing communication control. The PCON and HCON also control the appropriate outputs of the L2C. The PCON controls the CPU interface, L2 cache control, and the CPUDCD[3:0] signals. The HCON controls the host bus interface and the HBDCD[3:0] signals. Each of the blocks communicate with each other through the QCON and other appropriate control signals.

There are four queues implemented in the L2C/L2D architecture: Snoop Writeback Queue -(SWBQ), Cross-snoop Writeback Queue (XWBQ), Processor to Hostbus Queue (P2HQ), and Processor Writeback Queue (PWBQ).

The SWBQ is a 1-line deep queue and has the highest priority. The SWBQ handles an inquire cycle from a PCI bus master or a cross-CPU that hit to a modified line in the data cache(s). The contents of external snoop writeback buffer need to be written back to CMC/Biner as soon as possible.

The XWBQ is a 1-line deep queue and has the second highest priority. The XWBQ handles an inquire cycle from another CPU that hit to a modified line in the data cache(s). The contents of cross-snoop writeback buffer need to be written back to CMC/Biner.

The P2HQ is logically a 1-deep and 64-bit wide. It handles partial reads, cache line fill, postable and non-postable writes (partial line write to CMC) and I/O cycles.

The PWBQ is a 4-line deep random access queue. It handles either L1 or L2 line-replacement writeback cycles. The PWBQ is used as a dedicated buffer to store line-replacement writebacks temporarily. Thus, a cache line-fill that replaces a modified lines in the L1 data cache or up to 4 modified lines in the L2 cache can appear on the host bus first. The PWBQ can contain one L1 line-replacement writeback or up to 4 L2 line-replacement writeback. In addition, the PWBQ is a Content Addressable Memory (CAM). This allows each element in the queue to be snooped simultaneously.

A basic block diagram of a system with the L2C/L2D chip set is shown below:

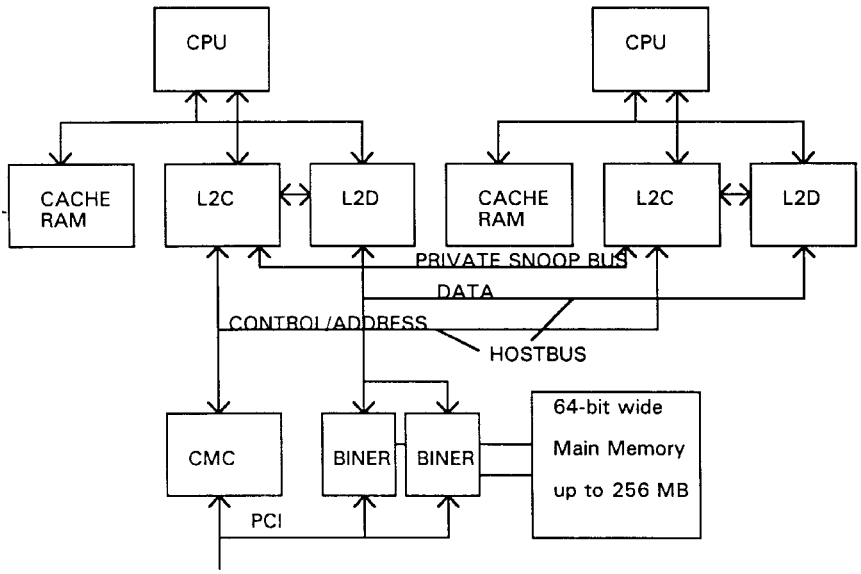

1.4. Cache Consistency Protocol

Cache consistency protocols are designed to ensure that cache data and main memory data are consistent. The L2C implements a write-back cache architecture with the MESI protocol. The CMC supports MSI which is a subset of MESI protocol. In addition, the L2C is designed to ensure that all of the bus masters in a shared memory system are prevented from reading stale data and also minimize the host memory bus utilization rate as well.

The L2C also supports caching of CPU locked cycles. Locked cycles are used for inter-processor and inter-task synchronization. If caching locked cycle is not supported or disabled, all locked cycles will appear on the host bus. In the past, CPU locked cycles are defined as non-cacheable memory cycles by the external caches. The synchronization of locked cycles from CPUs and/or I/O bus master is handled at the memory subsystem by the memory controller. This approach is very simple to implement. If the overall CPU locked cycles is relatively small, caching locked cycles may not improve the system performance much. Generally, this is true for most uni-processor systems.

However, in multi-processor (MP) systems the amount of CPU locked cycles increase drastically. Caching locked cycles will reduce the host bus utilization rate and also reduce the CPU locked memory latency. Therefore, caching locked cycles will improve the performance of MP systems.

In addition, the L2C also implements a unique feature called "invisible" snoop cycle to minimize the partial write traffic to the memory subsystem. The partial write cycle will cause CMC/Biner to do a read-modify-write cycle instead to support ECC. The invisible snoop cycle allows the current bus master to maintain cache consistency without generating a partial write cycle to the memory controller. The invisible snoop cycle also minimize the effect of not supporting the Exclusive state.

2. Design Description

2.1. Block Diagram

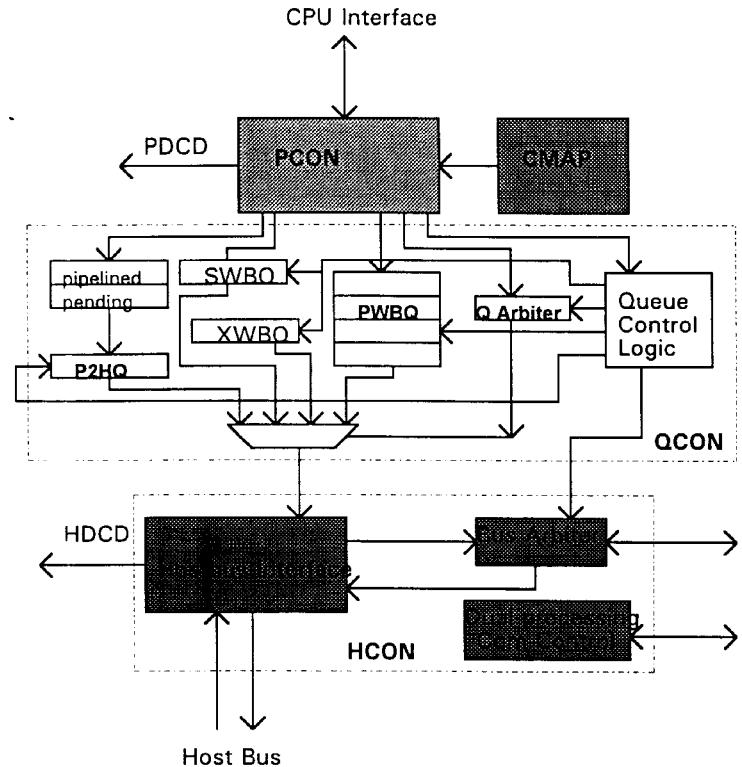

2.2. Processor Control Block (PCON)

The Processor Control Block controls the interface to the processor and the second level cache. PCON handles most of the logic to differentiate among various processors. PCON accepts cycles from the processor and then parses them out to the appropriate blocks such as QCON and HCON or runs the cycle to the L2 cache if the cycle is an L2 hit. The PCON consists of 24 submodules or about 30 state machines; these can be grouped into six basic areas. They are: Processor Interface, L1 Cache Interface and Processor Address Control, Tag RAM Control, L2 Cache Control, Cycle Decode, and Miscellaneous logic.

The PCON uses outputs of the CMAP for memory address decoding. The CMAP provides necessary memory attributes for the PCON to determine the cacheability of the current CPU address as defined by system. For example, the PCON can decide to post the current CPU memory write cycle or not based on the cacheability of the current write cycle.

The L2C also depends on the CMC to provide the cacheability attribute of a cache line during read allocate cycle. If HKEN_ asserted low by the CMC indicating that the current cache line is defined by system as writebackable memory location. The L2C always allocate the cache line directly either to shared for a read allocate cycle or to modified for a write allocate cycle. A block diagram of L2C PCON is shown below:

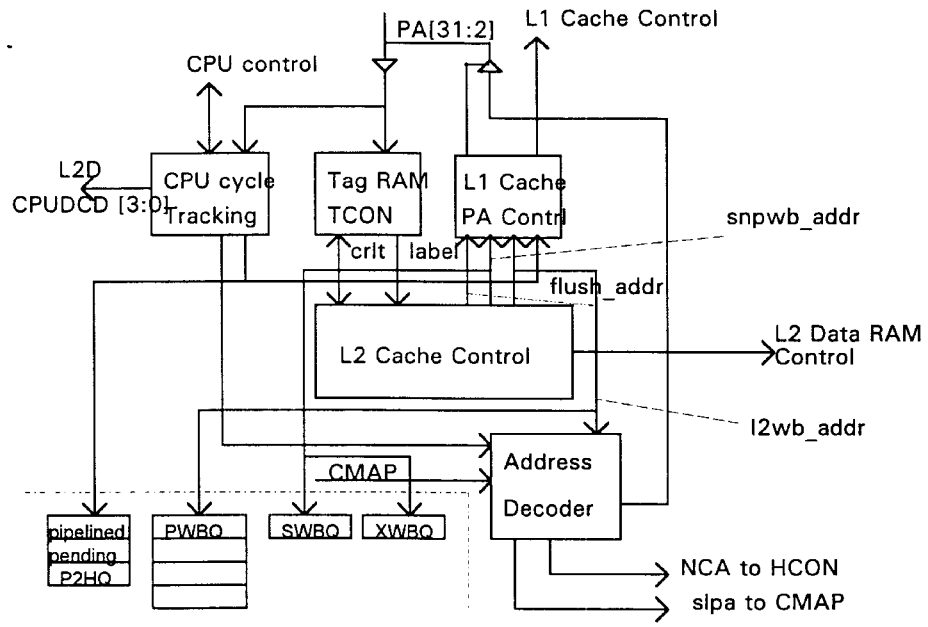

2.2.1.　　Processor Interface

The processor interface consists of decoding processor cycles, running snoops to the L1 cache, and some miscellaneous logic such as soft reset and mode speed control.

2.2.1.1.　　Processor Cycle Tracking

The processor cycle tracking logic tracks the various cycles that the processor can run, such as I/O reads and writes, memory reads, memory writes. Additionally, it controls the L2D CPUDCD[3:0] pins. There are several state machines which are used to track the cycles running in the system.

CPUTCON - The Processor Request Tracker State Machine tracks whether cycles are reads, writes, writebacks, or snoop writebacks. It also tracks pipelined cycles. The outputs of this state machine are used throughout the rest of the processor tracking logic.

CPURQQ - The CPU Request Queue state machine tracks how many cycles are outstanding. There can be from zero to three cycles outstanding. However, only two can be outstanding CPU cycles. The other cycle can cause by an external snoop hit to a modified line in L1 data cache. When pipelined, the number of outstanding requests moves to two. If both pipelined CPU cycles are pending and an inquire cycle hit to a modified line, the two pending cycles are back-offed and terminated by the L2C.

MEMRD - The Memory Read state machine tracks processor to memory reads. It tracks both burst and non-burst memory reads.

LOCWR - The Local Write state machine tracks local memory write cycles. It tracks burst and non-burst writes, as well as non-postable writes. The LOCWR state machine also tracks writes to write-protected memory. If a local write is pipelined into an allocate cycle, this state machine tracks the write cycle re-reading the L2 cache tag RAMs, since the state of the line may have changed as a result of the allocate.

MCONIF - The MCON interface state machine tracks processor to memory reads and writes. It tracks postable and non-postable memory writes.

ICONIF - The ICON interface state machine tracks processor to PCI reads and writes. It tracks postable and non-postable writes.

READY - This block sums all of the possible ready inputs to the processor and generates PBRDY_ signals.

L2BIF - This block controls the CPUDCD[3:0] pins to the L2D. It uses various logic from the processor cycle tracking block as well as some inputs from the L2 cache control block to generate these signals. The L2D decoded signals are a multiplexed code, whose values are shown below:

L2D CPU Decode

| Bit Positions | Functions | Comment |
|---|---|---|
| 0 | Idle | |
| 1 | SWBQ | PD --> Q |
| 2 | P2HQ (CPU write) | PD --> Q |
| 3 | XWBQ Load | PD --> Q |
| 4 | PWBQ0 | PD --> Q |
| 5 | PWBQ1 | PD --> Q |
| 6 | PWBQ2 | PD --> Q |
| 7 | PWBQ3 | PD --> Q |
| 8 | L2C Load Control | PD --> Q --> L2C |
| 9 | L2C Load Data | PD --> Q --> L2C |
| A | L2C Unload Data | L2C --> Q --> PD |
| B | L2D Status Unload | L2D Error Reg--> PD |
| C | H2PQ0 Unload | Q --> PD |
| D | H2PQ1 Unload | Q --> PD |
| E | H2PQ2 Unload | Q --> PD |
| F | H2PQ3 Unload | Q --> PD |

2.2.1.2. L1 Cache Interface

The L1 cache interface handles the snoop control of the L1 cache. This block has three main modules, PACON, L1C and L1SNP.

PACON - This logic tracks the state of the PA bus and who is driving it. PACON generates PAHOLD and sends flags to other modules indicating the state of the PA bus.

L1SNP - This state machine controls when to assert PEADS_ to the processor and PINV. It tracks when PAHOLD has been asserted from PACON, and then generates PEADS_. If the L1 cache is in writeback mode, this state machine will wait for PHITM_ from the processor.

If the 64-byte line option is selected, the state machine needs to run two snoop cycles back to L1 for a cross-CPU snoop cycle.

L1C - This logic handles the generation of PKEN_ and PWB/WT_ to the processor on read cycles. PKEN_ is used to convert a read into an L1 allocate. PWB/WT_ tells the processor whether to allocate to exclusive or shared. Allocation policies are controlled either by the CMAP's WP bit or P_WBWT depending on the cache hit or miss condition.

2.2.2. Second Level Cache Cycle Control

The second level cache control logic controls the cycles to the secondary cache, such as read hits, allocates, L2 writebacks. It also controls the generation of the subline cache address. Finally, it tracks the state of snoops to the L1 and L2 caches.

RDHIT - This state machine tracks L2 cache read hits. It generates COE, CADS_ and CADV_ for read hit cycles.

L2WB - This state machine tracks L2 writeback cycles. It generates COE, CADS_ and CADV_ for L2 writeback cycles. Depending on the cache line size, the number of writeback cycles can be either 4 (32-byte line) or 8 (64-byte line) cycles.

If a writeback of a 64-byte line caused by a PCI snoop or cross-CPU snoop cycle, the L2C needs to writeback the first 32-byte of data according to HA<5>. The L2C needs to perform back-to-back (atomic) writeback cycles to memory. HHITM_ is negated when the first 32 bytes of modified data is completely written back. HSNPOK_ is also negated to prevent the CMC from starting another PCI snoop cycle that can potentially cause a deadlock condition. The arbiter must maintain the ownership of the host bus until the two 32-byte lines are written back to memory.

For an L2 line-replacement writeback of a 64-byte line, the L2C needs to writeback the first 32-byte of data according to the PA<5>. The L2C needs to perform back-to-back (atomic) writeback cycles to memory. SNPOK_ is also negated to prevent CMC from starting another snoop cycle that can potentially cause a deadlock condition. The arbiter must maintain the ownership of the host bus until the writeback cycles are complete.

ALLOCD - The Allocate Data State Machine tracks the allocation of the data into the cache RAMs for any L2 allocate cycles. It generates CWE[7:0], CADS_, and CADV_ for L2 allocate cycles. L2 allocates are a result of either an L1 read miss or a processor write which is an L2 miss.

If the 64-byte line option is selected, the state machine will request the HCON to perform a 64-byte cache line-fill by generating two 32 bytes cache line-fill. The L2C will return the needed 32 bytes of data to the processor first. While waiting for the other 32 bytes from the memory, the L2C may have to assert the signal PAHOLD or PBOFF_ to prevent its local processor from starting another cycle.

ALLOCT - The Allocate Tag State Machine tracks the updating of the tag RAMs. This logic also generates the tag RAM data, based on internal WB/WT and HKEN_ control signals. L2 allocates are a result of either an L1 read miss or a processor write which is an L2 miss.

If the 64-byte line option is selected, the state machine will update the tag only when the second host bus read is committed by the CMC or cross-CPU snoop cycle is already complete.

CACON - This logic generates the subline addresses CA[1:0] for the cache data RAMs.

L2SNP - The L2 Snoop State Machine tracks the state of both L1 and L2 snoops. This logic controls PAHOLD and PBOFF_ assertion for snoop writebacks from either L1 or L2. It also tracks when snoop cycle is complete.

If the 64-byte line option is selected, the number of CPU snoop traffic to L2 could be minimized by half if L2C only snoop on 64-byte boundary. However, the L2C will snoop on 32-byte boundary.

2.2.3. Second Level Cache Tag Control (CPUTCON)

CPUTCON is the tag control logic. It controls accesses to the L2 tag RAM from both the CPU and snoop accesses.

2.2.3.1. Cache Response Matrix to CPU accesses

The following table outlines the basic cache responses to CPU cycles. This table defines how the cache will behave assuming there are no PCI cycles running to system memory. Following the table are exceptions where the L2 cache will not arrive in the expected state.

| CPU | Processor & Hostbus Status | | | | | | | | System Mapping | | L2C Cache State | | | Comments |
|---|---|---|---|---|---|---|---|---|---|---|---|---|---|---|
| Pentium | M/I/O | D/C | W/R | LOCK# | CACHE# | PCD | PWT | HKEN# | PWB | WP | HIT | PRES | NEXT | |
| I/O Code Read - INIT ACK Cycle | | | | | | | | | | | | | | |
| | 0 | 0 | 0 | X | X | X | X | X | X | X | X | X | X | INIT ACK - pass through to CMC |
| I/O Code Write - Special Cycles | | | | | | | | | | | | | | |
| | 0 | 0 | 1 | X | X | X | X | X | X | X | X | X | X | Special cycles - pass through to CMC Can L2C post the cycle? |
| I/O Data Read | | | | | | | | | | | | | | |
| | 0 | 1 | 0 | X | X | X | X | X | X | X | X | X | X | I/O read - pass through to CMC except L2C config. registers |
| I/O Data Write | | | | | | | | | | | | | | |
| | 0 | 1 | 1 | X | X | X | X | X | X | X | X | X | X | I/O write - pass through to CMC except L2C config. registers |
| Locked Memory Code and Data Read | | | | | | | | | | | | | | |
| | 1 | 0 | 0 | 0 | X | X | X | X | X | X | 1 | S | S | Locked L2 read hit - single L2 cache read L2C return the data after invisible snoop is complete if caching enabled |
| | | | | | | | | | | | | S | I | Invalidate the L2 cache if caching disabled new change to PCON |
| | 1 | 0 | 0 | 0 | X | X | X | X | X | X | 1 | M | M | Locked L2 read hit - single L2 cache read No host bus cycle, invisible snoop cycle not needed |
| | 1 | 0 | 0 | 0 | X | 0 | X | 0 | X | X | 0 | X | S | Locked L2 read miss - allocate to L2 if cacheable address, only one BRDY to CPU |
| | 1 | 0 | 0 | 0 | X | 1 | X | X | X | X | 0 | X | X | Bypass read - single read to CMC & CPU |

| CPU | Processor & Hostbus Status | | | | | | | System Mapping | | L2C Cache State | | | | Comments |
|---|---|---|---|---|---|---|---|---|---|---|---|---|---|---|
| Pentium | M/I/O | D/C | W/R | LOCK# | CACHE# | PCD | PWT | HKEN# | PWBWT | WP | HIT | PRES | NEXT | |
| | 1 | 0 | 0 | 0 | X | X | X | 1 | X | X | 0 | X | X | Bypass read - read allocate to CMC but HKEN_ is inactive, single read to CPU |
| Unlocked Memory Code Read | | | | | | | | | | | | | | |
| | 1 | 0 | 0 | 1 | X | X | X | 1 | X | X | 0 | X | X | Non-cacheable code read miss - single 64-bit read from CMC |
| | 1 | 0 | 0 | 1 | 0 | X | X | 0 | 1 | X | 0 | X | S | CPU Cacheable Code Read Miss - L2 Cache Line Fill from Memory - Burst back 32 bytes to CPU Allocate L1 to E * (WB/WT_ = 1) but CPU will allocate to Shared state instead |
| | 1 | 0 | 0 | 1 | 0 | X | X | 0 | 0 | X | 0 | X | S | CPU Cacheable Code Read Miss - L2 Cache Line Fill from Memory - Burst back 32 bytes to CPU Allocate L1 to S (WB/WT_ = 0) |
| | 1 | 0 | 0 | 1 | 1 | 0 | X | 1 | X | X | 0 | X | S | CPU Non-burstable code read miss - L2 cache line fill from memory - only one BRDY to CPU |
| | 1 | 0 | 0 | 1 | X | 1 | X | X | X | X | 0 | X | X | CPU non-cacheable code read miss - single 64-bit read from memory |
| | 1 | 0 | 0 | 1 | X | X | X | 1 | X | X | 0 | X | X | CPU non-cacheable code read miss - single 64-bit read from memory |
| | 1 | 0 | 0 | 1 | 0 | X | X | X | X | X | 1 | X | X | CPU burstable code read hit - cache line fill to L1 from L2 cache |
| | 1 | 0 | 0 | 1 | 1 | X | X | X | X | X | 1 | X | X | CPU non-burstable code read hit - return only one BRDY from L2 cache |
| CPU Unlocked Memory Data Read | | | | | | | | | | | | | | |
| | 1 | 1 | 0 | 1 | 0 | X | X | 0 | 1 | X | 0 | X | S | CPU data read miss - L2 cache line fill from memory, burst back 32 bytes to CPU, allocate to E in L1 (PWB/WT = 1) |
| | 1 | 1 | 0 | 1 | 0 | X | X | 0 | 0 | X | 0 | X | S | CPU data read miss to WP - L2 cache line fill from memory, burst back 32 bytes to CPU, allocate L1 to S (PWB/WT =0) |
| | 1 | 1 | 0 | 1 | 0 | X | X | X | X | 0 | 1 | X | X | CPU data read hit - burst read 32 bytes fro L2 cache, allocate L1 to E (PWB/WT = 0) |
| | 1 | 1 | 0 | 1 | 0 | X | X | X | X | 1 | 1 | X | X | CPU read hit to WP - burst read 32 bytes from L2 cache, allocate L1 to S (PWB/WT 0) |
| | 1 | 1 | 0 | 1 | 1 | 0 | X | 0 | X | X | 0 | X | S | CPU page table read miss - L2 cache line fill from memory but return only 1 BRDY_ to CPU |
| | 1 | 1 | 0 | 1 | 1 | X | X | X | X | X | 1 | X | X | CPU non-burstable data read hit - single 64-bit read from L2 cache |
| | 1 | 1 | 0 | 1 | X | X | X | X | 1 | X | X | 0 | X | CPU NCA data read miss - L2 cache line fill from memory but HKEN_ is inactive, the cycle will be a single transfer read from |

| CPU | Processor & Hostbus Status | | | | | | | System Mapping | | L2C Cache State | | | | Comments |
|---|---|---|---|---|---|---|---|---|---|---|---|---|---|---|
| Pentium | M/I/O | D/C | W/R | LOCK# | CACHE# | PCD | PWT | HKEN# | PWBWT | WP | HIT | PRES | NEXT | |
| | | | | | | | | | | | | | | memory, return 64-bit read to CPU |
| | 1 | 1 | 0 | 1 | X | 1 | X | X | X | X | 0 | X | X | CPU NCA data read miss - single 64-bit read from memory |
| Locked Memory Data Write | | | | | | | | | | | | | | |
| | 1 | 1 | 1 | 0 | 0 | X | X | X | X | 1 | X | X | X | CPU burst write to WP - ILLEGAL Return BRDY_ to CPU and ignore cycle |
| | 1 | 1 | 1 | 0 | 0 | X | X | X | X | X | 0 | X | X | Locked Burst Write Miss - ILLEGAL no snoop cycle allowed during CPU locked cycles if caching locked enabled<br><br>Locked Writes to Memory if caching disabled |
| | 1 | 1 | 1 | 0 | 0 | X | X | X | X | 0 | 1 | S | S | Locked L1 Writeback Hit - Can't occur if caching of locked enabled since no snoop cycle allowed during CPU locked cycles if caching disabled, broadcast WB to Memory and update L2 Cache data (due to snoop read hit) |
| | | | | | | | | | | | | S | I | Broadcast WB to memory and invalidate if snoop write hit |
| | 1 | 1 | 1 | 0 | 0 | X | X | X | X | 0 | 1 | M | X | Can't occur - The snoop would take the L2 state to either S or I |
| | 1 | 1 | 1 | 0 | 1 | X | X | X | X | 1 | X | X | X | CPU locked data write to WP - run non-posted locked write to CMC. The CMC will perform back-invalidate the cycle |
| | 1 | 1 | 1 | 0 | 1 | X | X | X | X | X | 0 | X | X | Locked data write miss - can't occur if caching locked enabled, non-posted write to CMC if caching locked disabled |
| | 1 | 1 | 1 | 0 | 1 | X | 0 | X | 1 | 0 | 1 | S | M | Locked Write Hit to S - Gain exclusive access to host bus, run invisible snoop cycl and Update data to Modified -- No Memory cycle if caching locked enabled, no change for PCON |
| | | | | | | | | | | | | S | I | Invalidate the cache line and run non-posted locked write to CMC |
| | 1 | 1 | 1 | 0 | 1 | X | X | X | X | X | 1 | M | M | Locked Write Hit to M - Gain exclusive access to Memory and Update cache data - No Memory cycle, no change for PCON if caching enabled |
| | | | | | | | | | | | | M | I | broadcast WB to CMC, run non-posted locked write and invalidate the cache line if caching disabled |
| Unlocked Memory Data Write | | | | | | | | | | | | | | |
| | 1 | 1 | 1 | 1 | 0 | X | X | X | X | 1 | X | X | X | Burst Write to WP - ILLEGAL |

| CPU | Processor & Hostbus Status | | | | | | System Mapping | | | L2C Cache State | | | Comments |
|---|---|---|---|---|---|---|---|---|---|---|---|---|---|
| Pentium | M/I/O | D/C | W/R | LOCK# | CACHE# | PCD | PWT | HKEN# | PWBWT | WP | HIT | PRES | NEXT | |
| | 1 | 1 | 1 | 1 | 0 | X | X | X | X | X | 0 | X | X | Burst write miss - post cycle in PWBQ |
| | 1 | 1 | 1 | 1 | 0 | X | X | X | X | X | 1 | S | M | Burst write hit - update burst data to L2 cache, don't post in PWBQ nor go to host bus |
| | 1 | 1 | 1 | 1 | 0 | X | X | X | X | X | 1 | M | M | Burst write hit - update burst data to L2 cache, don't post in PWBQ nor go to host bus |
| | 1 | 1 | 1 | 1 | 1 | X | X | X | X | 1 | 1 | X | X | CPU write hit to WP - return BRDY_ to CPU and ignore data, assert PEADS_ to back invalidate L1 |
| | 1 | 1 | 1 | 1 | 1 | 0 | 0 | 0 | 1 | 0 | 0 | X | S M | Write Miss - Back off CPU and Allocate to L2 Cache if write allocate enabled if allocate directly to M supported |
| | 1 | 1 | 1 | 1 | 1 | 1 | X | X | 1 | X | 0 | X | X | CPU NCA Write Miss - Post Write to Memory |
| | 1 | 1 | 1 | 1 | 1 | X | 1 | X | X | X | 0 | 0 | X | CPU Write Miss to write-through memory - non-posted write to memory |
| | 1 | 1 | 1 | 1 | 1 | X | 0 | X | 1 | 0 | 1 | S | M | L2 Write Hit - Update to Modified, L2C needs to delay tag update until non-posted write cycle has been updated to memory. |
| | 1 | 1 | 1 | 1 | 1 | X | X | X | X | 0 | 1 | M | M | L2 Write Hit - Update L2 Cache data (Write does not go to memory) |
| | 1 | 1 | 1 | 1 | 1 | X | 1 | X | 1 | 0 | 1 | X | X | L2 Write-through Write Hit - Post Write to Memory and update L2 Cache data |

2.2.3.2. Cache Response Matrix to Snoop Accesses

The following table outlines the L2C cache responses to snoop accesses.

| Host bus Cycle | WB Status | | L1 Snoop Control | | L2 Cache Control | | | | Comments |
|---|---|---|---|---|---|---|---|---|---|
| XNO-SNP | L1 WB/WT | L2 WB/WT | Snoop L1 | INV | Snoop L2 | X | PRES | NEXT | |
| Unlocked Memory Hostbus Read (read allocate) | | | | | | | | | |
| 1 | 0 | 0 | no | 0 | no | X | X | X | Non-cacheable memory cycle - no snoop or both L1 & L2 are in Write-through. |
| 0 | 0 | 1 | no | 0 | yes | 0 | I | I | L2 snoop miss |
| 0 | 0 | 1 | no | 0 | yes | 0 | S | S | L2 snoop hit to shared — no action |

| Host bus Cycle | WB Status | | L1 Snoop Control | | L2 Cache Control | | | | Comments |
|---|---|---|---|---|---|---|---|---|---|
| XNO-SNP | L1 WB/WT | L2 WB/WT | Snoop L1 | INV | Snoop L2 | XINV | PRES | NEXT | |
| 0 | 0 | 1 | no | 0 | yes | 0 | M | S | L2 snoop hit to modified -- write back dirty line |
| 0 | 1 | 0 | yes | 0 | no | 0 | x | x | Snoop L1 -- no further action |
| 0 | 1 | 1 | yes | 0 | yes | 0 | I | I | L2 snoop miss |
| 0 | 1 | 1 | yes | 0 | yes | 0 | S | S | L2 snoop hit to shared -- no action |
| 0 | 1 | 1 | yes | 0 | yes | 0 | M | S | L2 snoop hit to modified -- write back dirty line from either L1 or L2 |
| Unlocked Memory Hostbus Read (Write Allocate) | | | | | | | | | |
| 0 | 0 | 1 | yes | 1 | yes | 1 | I | I | L2 snoop miss, invalidate L1 |
| 0 | 0 | 1 | yes | 1 | yes | 1 | S | I | L2 snoop hit to shared -- invalidate, invalidate L1 |
| 0 | 0 | 1 | yes | 1 | yes | 1 | M | I | L2 snoop hit to modified -- write back dirty line & invalidate, invalidate L1 |
| 0 | 1 | 0 | yes | 1 | yes | 1 | X | I | Snoop L1 & L2 -- invalidate if hit |
| 0 | 1 | 1 | yes | 1 | yes | 1 | I | I | L2 snoop miss, invalidate L1 |
| 0 | 1 | 1 | yes | 1 | yes | 1 | S | I | L2 snoop hit to shared -- invalidate, invalidate L1 |
| 0 | 1 | 1 | yes | 1 | yes | 1 | M | I | L2 snoop hit to modified -- write back dirty line from either L1 or L2, invalidate L1 |
| Unlocked Memory Write | | | | | | | | | |
| 1 | X | X | X | X | X | X | X | X | Non-cacheable memory write cycle - no snoop |
| 0 | 0 | 0 | yes | 1 | yes | X | I | I | Snoop L1, L2 snoop miss |
| 0 | 0 | 0 | yes | 1 | yes | X | S | I | Snoop L1, L2 snoop invalidate |
| 0 | 0 | 1 | yes | 1 | yes | X | I | I | Snoop L1, L2 snoop miss |
| 0 | 0 | 1 | yes | 1 | yes | X | S | I | Snoop L1, L2 snoop invalidate |
| 0 | 0 | 1 | yes | 1 | yes | X | M | I | Snoop L1, L2 snoop hit to modified -- write back dirty line from L2 |
| 0 | 1 | 0 | yes | 1 | yes | X | X | X / I | Snoop L1 - write back dirty line of L1 if necessary. invalidate L2 if hit |
| 0 | 1 | 1 | yes | 1 | yes | X | I | I | Snoop L1 - write back dirty line of L1 and update L2 if necessary. L2 snoop miss |
| 0 | 1 | 1 | yes | 1 | yes | X | S | I | Snoop L1 - write back dirty line of L1 and update L2 if necessary. L2 snoop invalidate |
| 0 | 1 | 1 | yes | 1 | yes | X | M | I | Snoop L1 - write back dirty line of L1 and update L2 if necessary, else: L2 snoop hit to modified - write back dirty line in L2. Invalidate L2 |
| Aligned Locked Memory Read | | | | | | | | | |
| X | 0 | 0 | yes | 1 | yes | X | I | I | Snoop L1, L2 snoop miss |
| X | 0 | 0 | yes | 1 | yes | X | S | I | Snoop L1, L2 snoop invalidate |
| X | 0 | 1 | yes | 1 | yes | X | I | I | Snoop L1, L2 snoop miss |

| Host bus Cycle | WB Status | | L1 Snoop Control | | L2 Cache Control | | | | Comments |
|---|---|---|---|---|---|---|---|---|---|
| XNO-SNP | L1 WB/WT | L2 WB/WT | Snoop L1 | INV | Snoop L2 | XINV | PRES | NEXT | |
| X | 0 | 1 | yes | 1 | yes | X | S | I | Snoop L1, L2 snoop invalidate |
| X | 0 | 1 | yes | 1 | yes | X | M | I | Snoop L1, L2 snoop hit to modified -- write back dirty line |
| X | 1 | 0 | yes | 1 | yes | X | X | X I | Snoop L1 -- write back dirty line of L1 if necessary. invalidate L2 if hit |
| X | 1 | 1 | yes | 1 | yes | X | I | I | Snoop L1 -- write back dirty line of L1. L2 snoop miss |
| X | 1 | 1 | yes | 1 | yes | X | S | I | Snoop L1 -- write back dirty line of L1 and update L2 if necessary. L2 snoop invalidate |
| X | 1 | 1 | yes | 1 | yes | X | M | I | Snoop L1 -- write back dirty line of L1 and update L2 if necessary, else: L2 snoop hit to modified -- write back dirty line in L2. Invalidate L2 |
| Aligned Locked Memory Write | | | | | | | | | |
| X | 0 | 0 | yes | 1 | yes | X | I | I | Snoop L1, L2 snoop miss |
| X | 0 | 0 | yes | 1 | yes | X | S | I | Snoop L1, L2 snoop invalidate |
| X | 0 | 1 | yes | 1 | yes | X | I | I | Snoop L1, L2 snoop miss |
| X | 0 | 1 | yes | 1 | yes | X | S | I | Snoop L1, L2 snoop invalidate |
| X | 0 | 1 | yes | 1 | yes | X | M | I | Snoop L1, L2 snoop hit to modified -- write back dirty line from either L1 or L2 |
| X | 1 | 0 | yes | 1 | yes | X | X | X | Snoop L1 - write back dirty line of L1 if necessary. |
| X | 1 | 1 | yes | 1 | yes | X | I | I | Snoop L1 - write back dirty line of L1. L2 snoop miss |
| X | 1 | 1 | yes | 1 | yes | X | S | I | Snoop L1 - write back dirty line of L1 and update L2 if necessary. L2 snoop invalidate |
| X | 1 | 1 | yes | 1 | yes | X | M | I | Snoop L1 - write back dirty line of L1 and update L2 if necessary, else: L2 snoop hit to modified - write back dirty line in L2. Invalidate L2 |

2.2.3.3. Second Level Cache Flushing

The second level cache is flushed during power-up reset to insure that the cache is completely empty before being enabled.

After reset, only a FLUSH special cycle will flush the second level cache. During the special cycle, all of the tags are cleared. PNA_ is never asserted for the special cycle, further simplifying the logic. Flushing is controlled by the FLSH state machine and logic.

2.2.4. Second Level Cache Configurations

The second level cache may be configured for a variety of modes of operation. It is designed to support 512KB or 1MB cache sizes. The L2C supports burst SRAMs, and can support 32K depth of 64K depth cache data RAMs.

2.2.4.1. Tag RAM Configurations

The L2C has 4Kx20 tag RAM. This can be configured as two 2Kx20 RAMs. This can be configured into as many as 2 different cache tag modes for the Pentium-compatible CPUs. The following table lists the various modes and how the tag RAM is organized for each.

| Configuration (CPU, cache size, associativity, lines/block) | Label (PA) | Index (PA) | TAGAG (PA) | Line (PA) | Tagbank (PA) |
|---|---|---|---|---|---|
| P54C, 512K, 2-way, 4 lines per block | 27:18 | 17:07 | PA17 | PA[6:5] | - |
| P54C, 1MB, 2-way, 4 lines per block | 27:19 | 18:08 | PA18 | PA[7:6] | - |

In 2-way modes, the tag RAM organizes the two 2Kx20 as the two ways of the cache.

| | |
|---|---|
| bit [0] | LRU |
| bits [2:1] | line 0 state |
| bits [4:3] | line 1 state |
| bits [6:5] | line 2 state |
| bits [8:7] | line 3 state |
| bits [18:9] | label |
| bit [19] | Reserved |

2.2.4.2. Cache Size and Speed Configurations

The following table contains the cache configurations supported by the L2C. The second level cache speed, size, and associativity parameters are programmed in the Secondary Cache Controller Mode register, offset 52h. The bit breakout for this register is as follows:

```
Secondary Cache Controller Mode offset 52h
    Bits[7:6]    Way Prediction Select
                 00 = Always assume Way Hit (zero wait state)
                 01 = Use LRU Way Prediction*
                 10 = Use Last Code read Way Prediction
                 11 = Use Last Code or Data read Way Prediction
    Bit 5        SRAM type
                 1 = Burst SRAM*
    Bit 4        Secondary Cache Size
                 1 = 256KB (486), 512KB (P54C)*
    Bits[3:2]    Bank and Associativity
                 10 = 2-way, 2 bank cache
                 11 = reserved
    Bit 1        Secondary Cache Write Policy
                 1 = Write-back*
    Bit 0        Secondary (L2) Cache Enable
                 0 = L2 disabled*
                 1 = L2 enabled
```

The Way Prediction selects how way prediction should be done for a cache hit. Selecting "Always assume Way Hit" results in cache hits always running in zero wait states. This selection should be used for 33MHz or 50MHz direct mapped. Selecting "Use Way Prediction" results in zero wait state cache hits if the way prediction logic correctly predicted the way of the cache hit. This should only be used for a 2-way set associative cache. This selection should be used for 50MHz or 60MHz. If the logic is organized as use LRU way predict, then the cache uses the LRU to predict which way should be enabled for a read cache hit. This can only be used with a 2-bank cache. If the cache is organized as predict on last code or predict on last code or data, the CMC generates a signal called CMWAY, which connects to the most significant address line of the cache data RAMs. CMWAY is used as the way select. The LRU prediction cannot be used since the prediction must be made before the end of T1 to set up to PADS_ at the cache RAMs. Consequently, the prediction logic runs off of either the last code read or the last read of either code or data. The exact selection will be determined based on performance testing.

SRAM type selects between standard asynchronous RAMs, which may be used at 33MHz, and Burst RAMs, which must be used for 50MHz and 60MHz.

The Bank and Associativity bits reflect how the cache data RAMs are organized. A single bank cache has one cache RAM on each PD data line, while a two bank cache has two cache RAMs on each PD data line. The two bank cache is always organized as 2-way for higher performance. The single bank cache may be organized as either direct-mapped or 2-way.

When the L2 cache is disabled, a flush cycle must be run to completely turn the cache off. Until the flush cycle is run, the L2 cache is assumed to still be on.

The above six bits can be configured for Pentium mode. However, only 3 are legal combinations. The following tables outlines these combinations for Pentium based systems.

Cache Combinations

| Cache Siz | Banks | Associativity | Way Predict | SRAM type | Port 52h | CPU & speed | Cache RAMs | System |
|---|---|---|---|---|---|---|---|---|
| 512KB | 2 | 2-way | 0 | burst | 2Fh | | 32Kx18 (8) | |
| 512KB | 2 | 2-way | wp | burst | 7Fh | P54C-50 | 32Kx18 (8) | |
| 512KB | 2 | 2-way | 1 | burst | AFh | P54C-60 | 32Kx18 (8) | 60 |

2.2.5. Second Level Cache Cycles

2.2.5.1. Cache Cycles - Synchronous SRAMs

The L2C is designed to use synchronous burst RAMs for the cache when running either at 50 or 60 MHz. The L2C controls the CADS_, CADV_, COE_, CCS_, and CWE_ inputs to the burst SRAMs. The burst SRAM ADSP_ input is connected directly to the processor ADS_ signal.

The ADSP_ and CADS_ signals strobe in a new address into the burst RAMs. CADS_ is used to strobe the address into the burst SRAMs for L2 writebacks and pipelined cycles. The ADSP_ input is used for all non-pipelined processor reads and writes.

The CADV_ output of the L2C controls when the burst SRAMs should increment their internal address counters. They increment always follows the burst order of the Pentium. CADV_ is only pulsed for burst transactions such as L2 allocates, L2 cache hits, and writebacks.

The COE_ output of the L2C controls when the burst SRAMs should drive the PD bus. The L2C asserts this signal for cache read hits and L2 writebacks.

The CCS_ output of the L2C controls which bank of a two-way set associative cache is enabled. Also, CCS_ is negated during pipelined cycles to prevent the burst SRAMs from strobing in a new base address when ADSP_ is sampled asserted.

The CWE[7:0] outputs of the L2C control when the burst SRAMs should write data from the PD bus into the cache. These signals are asserted for L2 allocates and L2 write hits.

The following descriptions are applicable to L2C running at 50 MHz. Generally, running at 60 MHz would require one-wait state for cache hits (both with way prediction hit or miss).

2.2.5.1.1. CPU Write Single Cache Hit

For a non-pipelined CPU write, the base address is strobed into the cache burst SRAMs with PADS_. The L2C asserts PBRDY_ in zero wait states if the L2D can also write into its queue and the write is to a modified line. The L2C also asserts the appropriate CWE[7:0]_ signals, based on the asserted byte lanes. If the write is to a shared line then PBRDY_ is asserted in one wait state to allow for the tag to be updated. If the L2D queue is full, then the L2C waits until the L2D is ready to accept the write data. PNA_ is never asserted for cache write hits.

For a pipelined CPU write, the base address is strobed into the burst SRAMs with CADS_ with the last PBRDY of the previous cycle if the previous cycle was a cache read hit or a non-cacheable cycle; or following the last PBRDY_ of the previous cycle if the cycle wrote into the cache. The L2C asserts PBRDY on the next clock if the L2D can also write into its queue and the write is to a modified line. The L2C also asserts the appropriate CWE[7:0]_ signals, based on the asserted byte lanes. If the write is to a shared line then PBRDY_ is asserted after one clock to allow for the tag to be updated. If the L2D queue is full, then the L2C waits until the L2D is ready to accept the write data and terminate with PBRDY_. PNA_ is never asserted for cache write hits.

The CWE[7:0] pins are used to control the byte lanes to be written. For two-way set associative mode, each CWE pin is connected to two byte lanes, one for each way. The Chip Select (CS) pins are used to select the way to be written. If the CPU write is a cache miss, no CWE[7:0] signals are asserted.

2.2.5.1.2. CPU Write Burst Cache Hit

CPU write bursts are never pipelined. The base address is strobed into the cache burst SRAMs with PADS_. The L2C asserts PBRDY_ in zero wait states if the L2D can also write into its queue and the write is to a modified line. The L2C also asserts the all CWE[7:0]_ signals. If the write is to a shared line then PBRDY_ is asserted in one wait state to allow for the tag to be updated. If the L2D queue is full, then the L2C waits until the L2D is not full to write the data and terminate with PBRDY_. PNA_ is never asserted for CPU write bursts.

The L2C asserts CADV_ on the same clock as the second, third, and fourth writes to the burst SRAMs. If the CPU write is a cache miss, no CWE[7:0] signals are asserted.

2.2.5.1.3. CPU Read Single Cache Hit

For a non-pipelined CPU read, the base address is strobed into the cache burst SRAMs with PADS_. The L2C asserts PBRDY_ in zero wait states if the read is a cache read hit and a cache way hit. The L2C asserts COE_ and the appropriate CCS_ signal to drive the appropriate way onto the PD bus. If the read is a cache way miss, then the L2C asserts PBRDY_ in one cycle later to allow for the way selection logic to drive the opposite CCS_ lines.

For a pipelined CPU read, the base address is strobed into the cache burst SRAMs with CADS_ with the last PBRDY_ of the previous cycle if the previous cycle was a cache read hit or a non-cacheable cycle; or following the last PBRDY_ of the previous cycle if the cycle wrote into the cache. The L2C asserts PBRDY_ in zero wait states if the read follows another read. If the cache read hit follows a write or a read driven by the L2D, the L2C inserts one wait state after the last PBRDY_ of the write before the PBRDY_ of the read to allow for the bus to turn around. The L2C asserts COE_ and the appropriate CCS_ signal to drive the appropriate way onto the PD bus. Since the cycle is pipelined, no additional wait states are needed for way misses as the way selection is done during the previous pipelined cycle.

2.2.5.1.4. CPU Read Burst Cache Hit

For a non-pipelined CPU read burst, the base address is strobed into the cache burst SRAMs with PADS_. The L2C asserts four PBRDYs in zero wait states if the read is a cache read hit and a cache way hit. The L2C asserts COE_ and the appropriate CCS_ signal to drive the appropriate way onto the PD bus. If the read is a cache way miss, then the L2C asserts four PBRDYs in one wait state to allow for the way selection logic to drive the opposite CCS_ lines. The L2C asserts CADV_ during the first, second, and third PBRDYs to advance the burst address inside the burst SRAMs.

For a pipelined CPU read burst, the base address is strobed into the cache burst SRAMs with CADS_ with the last PBRDY_ of the previous cycle if the previous cycle was a cache read hit or a non-cacheable cycle; or following the last PBRDY_ of the previous cycle if the cycle wrote into the cache. The L2C asserts PBRDY_ in zero wait states if the read follows another read. If the cache read hit follows a write or a read driven by the L2D, the L2C inserts one wait state after the last PBRDY_ of the write before the PBRDY_ of the read to allow for the bus to turn around. The L2C asserts COE_ and the appropriate CCS_ signal to drive the appropriate way onto the PD bus. Since the cycle is pipelined, no additional wait states are needed for way misses as the way selection is done during the previous pipelined cycle. The L2C asserts CADV_ during the first, second, and third PBRDYs to advance the burst address inside the burst SRAMs.

2.2.5.1.5. Cache Allocate

The cache is allocated for CPU read allocates or CPU write allocates. In both cases, data is read from memory through the L2D and written into the cache. For non-pipelined processor read allocates, the base address is strobed into the cache burst SRAMs with PADS_. For pipelined processor read allocates, the base address is strobed into the cache burst SRAMs with CADS_. The L2C then begins the line fill. The L2C asserts all CWE[7:0]_ signals four times to write in the new data. The CADV_ signal is asserted for the second, third, and fourth writes. If the cycle is also an L1 allocate, PBRDY_ is asserted each time the CWE[7:0]_ signals are asserted.

Once PNA_ is asserted, the L2C negates all CCS_ signals to the burst RAMs to prevent a pipelined PADS_ from strobing in a new cache base address before the current allocate cycle is complete.

2.2.5.2. CPU Locked Accesses

.CPU locked cycles are defined as cacheable. If enabled, CPU locked accesses to the cache run very similar to unlocked accesses from a timing standpoint. The CPU is allowed to run locked read or write hits directly from/to the L2C cache. However, there are a few special rules that the L2C must follow to prevent any potential deadlock situations with the existing memory subsystem (CMC/Biner). The deadlocks can occur if two (or more) bus masters trying to do lock access and stall each other from getting the data. For example, one CPU and one PCI bus master are simultaneously trying to do lock accesses to the same cache line.

2.2.5.2.1. Aligned CPU Locked Read and Write Hits

If an aligned locked read hit to a modified (or exclusive) line, the L2C can provide the data directly to the local CPU without running an invisible snoop cycle to other CPU. The invisible snoop cycle is a snoop cycle that is invisible to the memory controller. Therefore, the CMC is not aware that a snoop cycle is being driven on to the host bus. The invisible snoop cycle is required only when there is more than one processor in the system.

If a locked read hit to a shared line, the L2C can provide the data to the CPU if and only if the invisible snoop cycle has been run on the host bus . If the L2C does not own the host bus, in this case, the L2C will have to arbitrate for the host bus. Meanwhile, the L2C asserts the PBOFF_ to CPU while waiting for the host bus. The PBOFF_ is used to simplify the design by minimizing the change in the PCON. Note: the L2C needs to resnoop the tag for the current locked read cycle to ensure that it still have a valid cache line after it gains control of the bus . While waiting for the bus, a snoop cycle may invalidate the same cache line. Therefore, it no longer has a valid line.

When all outstanding bus requests have finished and bus ownership has been granted, the L2C negates the PBOFF_ and let the CPU restarts the locked cycle. If the locked read still hit to shared, then, the master L2C starts the invisible snoop cycle by driving the host address bus without asserting the HADS. The private XADS will be asserted (instead of HADS) to inform the other L2C that invisible snoop cycle is occurring on the host bus. This will cause other caches to snoop and invalidate. The master L2C is then allowed to provide the requested data to the local CPU directly from the cache without running a locked read cycle to the CMC.

If two CPUs are concurrently running locked cycles that hits to shared, the non master L2C may have to backed off (PBOFF_) its local CPU to abort the locked cycle if both CPUs need the host bus. The current master CPU/L2C is allowed to perform and complete its locked cycle first. Until the host bus becomes available to the other CPU/L2C again, then the other L2C will negate the PBOFF_ signal and the local CPU is then allowed to restart the locked cycles on the host bus.

The potential problem can occur when both CPUs are trying to lock the same cache line. To alleviate the problem without using PBOFF_, the non-master L2C needs to resnoop its tag again when it becomes the host bus master to ensure the line is still valid. The PBOFF_ is also used in this case to simplify the design.

If both PCI bus master and CPU are concurrently running locked cycles to the same cache line, the L2C will stall the PCI locked cycle by negating either HSNPOK_ or HSNPVLD_ until CPU locked cycles are complete. The PCI locked read cycle may happen first but the CMC cannot start the memory cycles until the snoop cycle is completed.

CPU locked write hit is treated as same as an unlocked memory write hit to the L2C. A locked write that did not have a locked read preceding it is treated as an unlocked write.

2.2.5.2.2. Misaligned CPU Locked Read and Write Hits

The Pentium processor defines misaligned transfers as a 16-bit or 32-bit transfer which crosses a 4-byte boundary, or a 64-bit transfer which crosses an 8-byte boundary. Two reads followed by two writes may be locked together.

If a misaligned locked read hit to a valid line (modified, exclusive or shared), the L2C can provide the data directly to the local CPU without running an "invisible snoop" cycle to other CPU. However, the L2C needs to run a host bus locked read cycle to the CMC to gain control of lock resource in SMAP. The L2C should not return the data from the cache to the CPU nor stall the pending PCI snoop cycle until CMC returns the requested data. Once the lock resource is granted by the CMC, the L2C needs to own the host bus with HLOCK_ asserted until the misaligned locked cycle is completed, i.e., both PLOCK_ and PSCYC are negated by the CPU. The L2C does not assert PNA_ during misaligned locked cycle.

If a misaligned locked write hit to a valid line, the L2C can update the data and tag immediately. Assuming that a split cycle always preceding with locked read cycle.

2.2.5.2.3. CPU Locked Read Misses

An aligned or misaligned locked access but miss in the L2 cache is required to run the cycle on the host bus. For an aligned and cacheable locked read miss cycle, a cache line-fill will always be allocated (if caching locked cycle is enabled) directly to either Modified or Shared state at the completion of the cycle depending on the signals HKEN_ and HWB/WT from the CMC. If both signals are driven active during cache allocate cycle, the L2C will allocate the line directly to Modified state. If HKEN_ is active (low) but HWB/WT is inactive (low) during the allocate cycle, the L2C will allocate the line directly to Shared state. If HKEN_ is inactive (high), the L2C will not cache the returned data.

For a misaligned locked read miss cycle, the L2C needs to gain control of the host bus and lock resource in SMAP by running a locked read cycle to the CMC. The L2C needs to keep HLOCK_ asserted until the split locked sequence is completed.

If a PCI bus master is already owned the lock and the CMC is running the PCI-to-memory locked cycles. The CPU can never run a locked cycle hit to the same cache line that already locked by the PCI bus master. This is because the PCI locked access is always treated as a snoop write, resulting in the caches being invalidated. Consequently, all CPU accesses to a locked line are misses. These misses are further stalled by the CMC until the PCI bus master relinquishes the locked line.

2.2.5.2.4. CPU Locked Write Misses

For a misaligned or non-cacheable aligned locked write miss cycle, the L2C needs to run a locked write cycle to the CMC and keeps HLOCK_ asserted until the last locked write cycle is completed.

A locked write that did not have a locked read preceding it is treated as an unlocked write.

2.2.5.2.5. Proposed Cache Response Matrix for Multiple Locked Accesses

| MRM | LRM | PCI Snoop Cycle | Comment |
|-----|-----|-----------------|---------|
|     |     |                 |         |

| MRM | LRM | PCI Snoop Cycle | Comment |
|---|---|---|---|
| Aligned rd or wr hit to M (or E) | Aligned hit to M or (E) | Stall if pending | Each CPU is allowed to complete locked cycles concurrently |
| Aligned rd hit to S | Aligned hit to M or (E) | Stall if pending | Invisible snoop cycle required, XLOCKTOSH asserted by MRM, LRM is allowed to complete its locked cycle |
| Aligned wr hit to S<br>S --> M | Aligned hit to M or (E) | Stall if pending | Invisible snoop cycle not required for locked wr if preceding with locked rd, XLOCKTOSH asserted by MRM |
| Aligned rd or wr hit to S<br>if wr S --> M | Aligned hit to S | Stall if pending | Invisible snoop cycle required for locked rd, Invisible snoop cycle not required for locked wr if preceding with locked rd, XLOCKTOSH asserted by MRM, PBOFF_ asserted by LRM to abort current locked cycle |
| Aligned rd miss (Cacheable)<br>I --> S | BOFF pending locked except aligned hit to M or E | Negate the next one | MRM needs to run a host bus read allocate to CMC with XINV and XLOCKTOSH asserted, update the cache line, return single 64-bit data from CMC to CPU |
| Misaligned rd miss or aligned rd miss to non-cacheable, no tag update required | BOFF pending locked except aligned hit to M or E | Negate the next one | MRM needs to run a host bus locked read to CMC to gain control of lock resource, keep HLOCK_ asserted until the locked sequence is complete, return single 64-bit data from CMC to CPU |
| Misaligned rd hit to valid line<br>S --> S or<br>M --> M | BOFF pending locked except aligned hit to M or E | Negate the next one | MRM needs to run a host bus locked read to CMC to gain control of lock resource, keep HLOCK_ asserted until the locked sequence is complete, XLOCKTOSH asserted by MRM if hit to shared, return single 64-bit data from L2 cache to CPU after HBRDY_ is returned by CMC |
| Misaligned wr miss or aligned wr miss to non-cacheable, no tag update required | BOFF pending locked except aligned hit to M or E | No pending snoop cycle but inhibit the next one | MRM needs to run a host bus locked wr to CMC, keep HLOCK_ asserted until the locked sequence is complete, broadcast single 64-bit write data from CPU to CMC |
| Misaligned wr hit to valid line<br><br>S --> M<br>M --> M | BOFF pending locked except aligned hit to M or E | No pending snoop cycle but inhibit the next one | MRM needs to maintain control of lock resource in SMAP by keeping HLOCK_ asserted until locked sequence is complete, XLOCKTOSH asserted by MRM if hit to shared, broadcast single 64-bit write data from CPU to CMC if hit to shared or update the data to L2 cache if hit to modified |

Legend:
MRM - Current host bus master
LRM - Current non host bus master or slave
XLOCKTOSH - The MRM is executing a locked transfer to a shared line.

Note: The MRM may have to back off the current misaligned locked hit cycle if the pending PCI snoop cycle hit to the same address as the CPU.

2.2.6. Cycle Decodes

This section details some of the special decodes that are done by the L2C. The PCON block does most of the cycle decoding in the REQ, ICONIF, MCONIF, CFG, and XADDR blocks.

2.2.6.1. Memory Cycle Decoding

CPU to memory cycle decoding is performed in the REQ block during T2 (or second T2 at one wait state operation). Memory cycles are decoded with L2 cache HIT and outputs from the CMAP. If the L2 tag RAM indicates the memory cycle is a hit, then it is run as a cache read or write hit. If the cycle is a miss, then the PCON (via the QCON) generates a memory request to the HCON. Refer to HCON section for more information.

2.2.6.2. I/O Space to Program the L2C Indexed Registers

-The L2C will detect all the special cycles mapping to the L2C. L2C Special cycle decoding is done in the CFG module of PCON during T2 (or second T2 at one wait state operation).

The L2C will be configured to run a special cycle between the L2D and L2C when detecting I/O addresses 0CF0-0CF7.

2.2.6.3. Interrupt Acknowledge Cycles and Special Cycles

Interrupt Acknowledge cycle decoding is done in the ICONIF module of PCON during T2 (or second T2 at one wait state operation). Special Cycles are decoded in the REQ module. PCON decodes two interrupt acknowledge cycles. The L2C will pass two interrupt acknowledge cycles to the CMC.

PCON decodes all special cycles from the processor. The L2C will pass all special cycles to the CMC. SHUTDOWN and HALT special cycles are sent by the CMC to the PCI bus. All other special cycles are terminated inside PCON by returning PBRDY_ to the processor.

The L2C flushes the second level cache whenever the processor runs a FLUSH, or FLUSHACK special cycle. The L2C takes no action for all other special cycles (such as branch trace messages, Write Back, STPCLK acknowledge) other than to return BRDY_.

P54C Special Cycles

| Special Cycle | PA[4:3] | BE7 - BE0 | Action Taken by L2C (actions taken by CMC) |
|---|---|---|---|
| Shutdown | 00 | 1 1 1 1 1 1 1 0 | forward to host bus, (forward to PCI and pulse SRESET) |
| Flush | 00 | 1 1 1 1 1 1 0 1 | writeback and flush L2, don't forward to CMC |
| Halt | 00 | 1 1 1 1 1 0 1 1 | forward to host bus, (CMC forward to PCI) |
| Writeback | 00 | 1 1 1 1 0 1 1 1 | forward to host bus, (no action by CMC) |
| Flush Ack | 00 | 1 1 1 0 1 1 1 1 | writeback and flush L2, don't forward to CMC |
| Branch Trace Msg | 00 | 1 1 0 1 1 1 1 1 | forward to host bus, (no action by CMC) |
| STPCLK Ack | 10 | 1 1 1 1 1 0 1 1 | forward to host bus, (no action by CMC) |

2.2.6.4. No Pipelined Cycles

The nopipe control is in the PALATCH module of PCON.

The L2C does not return PNA_ to the processor for any cycles to configuration space and misaligned locked cycles. Additionally, the L2C does not pipeline to I/O ports 0CF0-0CF7 and CF8h-CFFh. For design simplicity, Pentium special cycles are not pipelined.

To support MP logic, INTA cycles are never pipelined. Further, the L2C does not pipeline accesses to I/O C70h, and I/O writes to 0F0h.

2.2.6.5. Cycle posting control

The cycle posting control is in the REQ module of PCON. The various nopost signals control whether a cycle can be posted. The L2C will not post any memory write hit to shared. In addition, The L2C never posts writes to I/O ports 0CF0-0CF7,CF8h, 20h-2Fh, A0h-AFh, or to any configuration space registers. Further, it does not post to 0F0h to support MP logic.

The VGA address decodes are as follows:

VGA Memory = 000A0000h - 000BFFFFh
VGA I/O = 102h + x3Cxh + 3B4h-3B5h + 3BAh + 3D4h-3D5h + 3DAh + 46E8h where x is a don't care.

Write posting to memory can be permanently shut off via a control bit in CMAP. Note, however, that writebacks are still posted.

2.3. Queue Control Block (QCON)

The QCON consists of Snoop Writeback Queue (SWBQ), Processor to Host Queue (P2HQ), Processor Writeback Queue (PWBQ), queue arbiter and control logic. Each queue stores address, control and status information. The PCON provides the necessary information into these queues and sets the appropriate valid bit. The queues are control by the queue control logic and operate in lock-step with the corresponding data buffers in the L2D. In addition, each queue has a valid bit for each entry or element to track the state of the queue. When a valid bit is set, the QCON will generate an internal host bus request to the HCON. If two or more valid bits are set, the queue arbiter will determine which cycle to run first on the host bus.

2.3.1. SWBQ

The SWBQ is a 1-line deep queue and has the highest priority. The SWBQ handles a PCI inquire cycle that hit to a modified line in the data cache(s). The inquire cycle can hit to modified state in both L1 and L2 caches. In this case, the L1 data cache has the most recent data. It's very important for the L2C/L2D to have a separate or dedicated writeback buffer to store writeback data and address caused by a PCI snoop cycle that hit to a modified line in the L1 and/or L2 caches. Once the valid bit is set, the L2C is ready to transfer the modified line to memory as soon as possible.

If the PCI snoop cycle hit to modified line and HHITM_ asserted, the CMC expects to see the snoop writeback cycle to occur next. The CMC normally allows the current host bus cycle to complete first. The snooping L2C that asserts the HHITM_ will arbitrate and gain control of the host bus to perform the appropriate writeback cycles to the CMC. Thus, the current PCI bus master can proceed with its memory operation. The detailed description of the queue is as follows:

| | |
|---|---|
| bit[0] | Valid bit |
| bit[1] | ADS - Address Strobe Indication to Memory Controller<br>0 - Visible Cycle<br>1 - Invisible Cycle - not currently supported |
| bit[2] | XINV_ - Cross-CPU Snoop Invalidate. Used by the snooping L2C to invalidate the cache line if present. |
| bit[3] | XNOSNP_ - Cross-CPU No Snoop Required Indication. The current MRM indicates to the LRM that the current host bus cycle is a writeback, I/O, or non-cacheable cycle. |

Therefore, no snooping is required by the LRM. It is used to minimize the cross-CPU snoop traffic and snoop latency. XSNPVLD_ will be ignored by the MRM if asserted.

bits[30:4]   Host address bits[31:5].

2.3.2. XWBQ

The XWBQ is a 1-line deep queue and has the second highest priority. The XWBQ handles a cross-CPU inquire cycle that hit to a modified line in the data cache(s). The inquire cycle can hit to modified state in both L1 and L2 caches. In this case, the L1 data cache has the most recent data. It's very important for the L2C/L2D to have a separate or dedicated writeback buffer to store writeback data and address caused by a PCI snoop cycle that hit to a modified line in the L1 and/or L2 caches. Once the valid bit is set, the L2C is ready to transfer the modified line to memory as soon as possible.

If the cross-CPU snoop cycle hit to modified line and XHITM_ asserted, the current MRM expects to see the snoop writeback cycle to occur next. The current MRM must complete the current host bus cycle and ignore the returned stale data from memory. Note: The L2C cannot abort the current memory cycle by asserting the HBOFF_. The HBOFF_ is driven only by the CMC.

The current MRM must not return the stale data to CPU nor update the data to the cache SRAMs. The LRM L2C that asserts the XHITM_ will arbitrate to gain control of the host bus. Once the bus ownership has been granted, the LRM L2C will assume the MRM state, and the other L2C that was the MRM will become the LRM. The MRM that asserts the XHITM_ will perform the appropriate writeback cycle and start the cache-to-cache transfer sequence on the host bus. The LRM L2C will "snarf" and update the requested data directly from the host bus. The LRM L2C now can return the requested data to the CPU and update the cache SRAMs accordingly. The detailed description of the queue is as follows:

| | |
|---|---|
| bit[0] | Valid bit |
| bit[1] | ADS - Address Strobe Indication to Memory Controller<br>0 - Visible Cycle<br>1 - Invisible Cycle - not currently supported |
| bit[2] | XINV_ - Cross-CPU Snoop Invalidate. Used by the snooping L2C to invalidate the cache line if present. |
| bit[3] | XNOSNP_ - Cross-CPU No Snoop Required Indication. The current MRM indicates to the LRM that the current host bus cycle is a writeback, I/O, or non-cacheable cycle. Therefore, no snooping is required by the LRM. It is used to minimize the cross-CPU snoop traffic and snoop latency. XSNPVLD_ will be ignored by the MRM if asserted. |
| bits[30:4] | Host address bits[31:5]. |

2.3.3. P2HQ

Logically, the P2HQ is a 1-deep FIFO queue. It handles partial reads, cache line fill, postable and non-postable writes (partial write to CMC) and I/O cycles. There are two corresponding buffers in the L2D for the P2HQ. The first buffer is called H2PQ or read buffer. This buffer loads serially from the host bus and unloads randomly on the 64-bit or 8-byte boundary. This buffer is used for single read, read allocate, and cache-to-cache transfer. The second buffer is called P2HQ or write buffer. This buffer is only 1-deep and 64-bit wide.

The P2HQ is a 47-bit wide queue from the PCON to the HCON. The queue is one element deep. The detailed description of the queue is as follows:

| | |
|---|---|
| bit[28:0] | A[31:3] - These bits correspond to the processor address PA[31:3]. |
| bit[36:29] | BE[7:0] - These bits correspond to the processor byte enables PBE[7:0]. |
| bit[37] | CACHE_ - Processor Cache Signal |
| bit[38] | D/C - Processor Data/Code Signal |
| bit[39] | M/IO - Processor Memory/Input-Output Signal |
| bit[40] | W/R - Processor Write/Read Signal |
| bit[41] | LOCK_ - Processor Bus Lock Indication |
| bit[42] | SCYC - Processor Split Cycle (misaligned locked transfer) Indication<br>HCON uses this bit to keep HLOCK_ asserted until the misaligned locked transfer is complete. |
| bit[43] | ADS_ - Address Strobe Indication to Memory Controller<br>0 - Visible Cycle<br>1 - Invisible Cycle |
| bit[44] | XINV_ - Cross-CPU Snoop Invalidate. Used by the snooping L2C to invalidate the cache line if present. |
| bit[45] | XNOSNP_ - Cross-CPU No Snoop Required Indication. The current MRM indicates to the LRM that the current host bus cycle is a writeback, I/O, or non-cacheable cycle. Therefore, no snooping is required by the LRM. It is used to minimize the cross-CPU snoop traffic and snoop latency. XSNPVLD_ will be ignored by the MRM if asserted. |
| bit[46] | XLOCKTOSH_ - Cross-CPU Locked-to-Shared Indication. The current MRM indicates to the LRM that the current CPU locked cycle hit to a shared line or is being allocate to shared. The LRM uses the signal to determine when to abort the pending CPU locked cycle. |

2.3.4. PWBQ

The PWBQ is a 36-bit wide queue from the PCON to the HCON. The queue is a Content Addressable Memory (CAM). The queue is one element deep with four valid bits. Each valid bit maintains the status of each modified line in the queue. If the modified line is from the L1, the Valid Bit 0 is used only. If the modified line is from the L2, the Valid Bit 0-3 may be used since the L2 tag can potentially contain up to four modified lines per tag. The detailed description of the queue is as follows:

| | |
|---|---|
| bits[3:0] | Valid Bits. |
| bits[24:4] | Index address from the processor address [17:7] |
| bits[34:25] | Label address from the internal L2 tag |
| bits[38:35] | The most four significant address bits PA[31:28] = 0000 |

2.3.5. Queue Arbiter

The queue arbiter selects which queue will be run next on the host bus. The SQBQ always has the highest priority. Under the simple arbitration rule, the P2HQ is usually the next highest priority. Normally, the PWBQ has the lowest priority. However, two exceptions to the simple arbitration rule are: 1) if LRM when a cache-to-cache transfer or bus snarfing cycle is required on the host bus, and 2) if MRM when a CPU write to memory occurs and the PWBQ is not emptied. In these cases, the PWBQ will have higher priority than the P2HQ.

2.3.6. Queue Control Logic

The queue control consists of queue management which controls the address and data flow of each pending queue.

2.4. Host Control Block (HCON)

The Host Control Block controls the interface to the memory controller via the host bus and the private interface to the PCON via the snoop logic. The HCON handles most of the logic to directly interface with the existing CMC/Biner. The HCON accepts host bus requests from the QCON and then parses them out to its appropriate subblocks. The HCON also generates all the appropriate signals to inform the PCON and QCON about the status of the current host bus or snoop cycle.

The HCON allows one PCI or cross-CPU snoop cycle to occur on the host bus. The next snoop cycle will be allowed to occur when the current snoop cycle is completed and no writeback pending.

2.4.1. Host Bus Interface

The host bus interface consists of decoding host bus cycles, generating snoop request and host-to-memory to PCON, and some miscellaneous logic.

2.4.2. Host Bus State Machine

The state machine controls the host address and control signals. It also controls the data flow by generating the data HBDCD[3:0] pins to the L2D. It also keeps track of the in-bound host bus cycle as well as out-bound host bus cycle. The state machine also informs the QCON when the current host bus cycle is completed.

The L2D decoded signals are a multiplexed code, whose values are shown below:

| Bit Positions | Functions | Comment |
|---|---|---|
| 0 | Idle (reset) | HD --> Q |
| 1 | H2PQ (rd data) | HD --> Q |
| 2 | SWBQ (unload) | Q --> HD |
| 3 | P2HQ (unload posted wr) | Q --> HD |
| 4 | PWBQ0 (unload) | Q --> HD |
| 5 | PWBQ1 (unload) | Q --> HD |
| 6 | PWBQ2 (unload) | Q --> HD |
| 7 | PWBQ3 (unload) | Q --> HD |
| 8 | XWBQ non-burst unload | Q --> HD |
| 9 | XWBQ burst unload | Q --> HD |

2.4.3. Host Bus Arbiter

The host bus arbitration mechanism allows both L2Cs to look like a single Pentium processor to the CMC. The L2C implements a fair arbitration scheme. If the Least Recent Master (LRM) L2C needs to run a host bus cycle it will generate a bus request to the Most Recent Master (MRM). The MRM L2C will grant the LRM L2C bus ownership as soon as all outstanding bus requests have finished on the host bus. Then, the LRM L2C will assume the MRM state, and the other L2C which was the MRM will become the LRM. The bus request pin is always the input to the MRM and the bus grant pin is always the output of the MRM.

The LRM L2C will request ownership of the host bus by asserting the host bus request pin, BREQ_. The current MRM L2C will grant the host bus to the LRM as soon as any pending host bus cycles have completed. The MRM will notify that the LRM can assume ownership of the bus by asserting the bus grant pin, BGRNT_.

During the power up reset, the state of each arbiter will be determine by the input pin SLEEP_. The primary L2C will always come out of reset as the MRM. The secondary L2C will always come out of reset as the LRM. The PMIC generates the SLEEP_ signals to both L2Cs.

Misaligned, non-cacheable locked cycles and 64-byte line present exceptions to the simple arbitration rules. The mentioned cycles will be performed as atomic host bus operations without interrupt from the LRM unless XHITM_ is asserted by the LRM. If XHITM_ is asserted by the LRM, the MRM will grant the bus to the LRM and allow the write back to complete.

In addition to both CPUs, the CMC may request for the host address bus to run a PCI snoop cycle. A PCI snoop cycle is allowed to run if SNPOK_ asserted.

2.4.4. Dual Processing Communication Control

This logic controls the private snoop bus between two L2Cs. It also generates the signals SNPOK and SNPVLD to the host bus.

2.4.5. Host Bus Cycles

2.4.5.1. Read Allocate

A host bus read allocate will be generated when a CPU read miss occurs. The CPU read cycle cannot be serviced locally by the L2C because the requested data is missing from the L2 cache. Before a host bus is executed, the PCON determines the cacheability attribute of the requested address. The CMAP provides the cacheability attributes to the PCON. If the address is defined as cacheable, the PCON will request the HCON to run a cache line fill. If the address is defined as non-cacheable, the PCON will request the HCON to run a single host bus read instead.

If a cache line fill is executed, the returned data from memory is written into the cache SRAMs. The PCON also updates the internal tag by overwriting an invalid line or replacing the least recently used line if both ways have valid lines. If it has been modified, the least recently used line is also transferred into the PWBQ prior to the read allocate. Eventually, all the replacement lines are copied back to the main memory.

The new tag state is determined as followed:

- [S] if the lined is Write-Protected or Read-Only.
- [S] if the CPU write through attribute is active (PWBWT high).
- [S] if the memory attribute is defined as non-writebackable.

Note: Since the exclusive state is not supported by the L2C, a cache line-fill always allocate to shared state.

2.4.5.2. Non-Burst Write

A non-burst or single write cycle occurs when the CPU generates a write cycle and the data is not present in the L2C. The L2C may post the write cycle if the write is an I/O or non-cacheable memory. The cacheable memory write is defined as non-postable by the L2C.

2.4.5.3. Write Allocate

If write allocation is enabled, the normal write miss is handled differently by the L2C. The L2C asserts the signal PBOFF_ to abort the current write miss cycle. If the write is pipelined, the L2C allows the pending cycle to complete before asserting the PBOFF_. Once the write miss cycle is backed off, the L2C runs a write allocate on the host bus. The write allocate to the CMC is the same as read allocate. However, the XINV_ is asserted to inform the other L2C in the system to snoop and invalidate the line. When the requested line fill is returned from memory, the L2C updates the data and the tag to modified state. Then, the PBOFF_ is negated, allowing the CPU to restart the previously write miss cycle. However, this time as an L2 write to modified line. The write data is updated to the SRAMs.

2.4.5.4. Cache-to-Cache Transfers

The L2C supports cache-to-cache transfers or "bus snarfing" during a read or write allocation by transferring the requested data directly from another cache. The snooping L2C or LRM asserts the XHITM_ to inform the bus master that the current snoop cycle hit to a modified line. The current master must ignore the returned stale data from memory by not returning the PBRDY_ back to its CPU. The current MRM will grant the LRM bus ownership as soon as the current host bus has been completed. Once the bus ownership has been granted, the LRM will assume the MRM state and perform a writeback cycle to memory. The other L2C which was the MRM will become the LRM and "snarf" the requested data available on the host bus. The data is being updated in main memory as well during the cache-to-cache transfer.

If the cache-to-cache transfer caused by a read allocate cycle, the snarfing L2C will update the data to the cache SRAMs and mark the tag as shared. If the cache-to-cache transfer caused by a write allocate cycle, the snarfing L2C will update the data to the cache SRAMs and mark the tag as modified. The current MRM will change the state of the line from modified to either shared if caused by a read allocate (XINV_ negated) or invalid if caused by a write allocate cycle (XINV_ asserted).

If the XHITM_ is asserted during a host bus write to memory, the MRM needs to complete the current bogus cycle and transfer the bus ownership to the LRM. Once the bus ownership has been granted, the LRM will assume the MRM state and perform a writeback cycle to memory. After the writeback is completed, the bus ownership is switched again. Now, the MRM needs to rerun the CPU write to memory. The PCI snoop cycle is not allowed to occur until the second attempt CPU write to memory is completed.

2.4.5.5. Invisible Snoop Cycle

The invisible snoop cycle is a snoop cycle that is invisible to the CMC. Therefore, the CMC is not aware that a snoop cycle is being driven onto the host bus. The invisible snoop cycle is required only when there is more than one processor in the system. In addition, the invisible snoop cycle is used to minimize the partial write traffic to the memory subsystem. The partial write cycle will cause CMC/Biner to do a read-modify-write cycle instead to support ECC. The invisible snoop cycle allows the current bus master to maintain cache consistency without generating a partial write cycle to the memory controller.

The master L2C starts the invisible snoop cycle by driving the host address bus without asserting the HADS_ when it is safe to do so. The private XADS_ is asserted instead of HADS_ by the MRM to inform the other L2C that an invisible snoop cycle is occurring on the host bus. This will cause other caches to snoop and invalidate if present.

2.5. Memory Consistency

2.5.1. CPU Accesses to Memory

Whenever the CPU accesses memory, the L2C must insure that memory is consistent. Inconsistencies may occur due to CPU read bypass posted write of the same cache line.

On a processor read from memory, the HCON insures that the SWBQ, PWBQ and any pending posted write in the P2HQ are emptied before performing the read. This is to simplify the design and to insure the ordering of pending cycles in various queues. The HCON must also check to see if there is any outstanding memory write data stored in the SWBQ, PWBQ and P2HQ. The SWBQ has the highest priority among all the queues The PWBQ is a content addressable memory (CAM) for addresses, which allows the each element in the queue to be snooped. However, the PWBQ can snoop only by the in-bound host bus cycle not the out-bound cycle. If the PWBQ has data stored in it which the CPU is attempting to read or not, the HCON will empty all the pending queues before allowing read to occur. This prevents data inconsistency from occuring.

On a processor locked access to CMC, HCON insures that both the SWBQ, PWBQ, and P2HQ are flushed before a locked access is allowed to begin. This insures that memory is fully coherent before the locked access is allowed to proceed. If a PCI master already owns the lock resource, then CPU locked accesses to the CMC are stalled until the PCI master releases the lock. In some cases, the L2C can stall the PCI master by using either HSNPOK_ or HSNPVLD_ signal.

2.5.2. Strong Write Ordering

The L2C supports strong write ordering as same as the Pentium processors. The L2C uses the P2HQ for posting a CPU write cycle. No host bus reads (as a result of cache miss) are reordered around the previously generated write posting in the P2HQ buffer. CPU writes will be driven to the host bus or updated in the cache in the order that they occur. HCON insures that the writes are written to the host bus in order. HCON always removes CPU writes in the order they were written into the P2HQ.

The L2C will not allow the processor to update or write to E or M-state lines in the data caches if there is a posted write pending or a write cycle is runing on the host bus by negating the PEWBE_ signal. Once the current write cycle is complete, PEWBE_ is asserted to inform the CPU that the previously generated write is already emptied. Next CPU write is then allowed to occur.

If PEWBE_ is inactive, the L2C will also stall subsequent write hit or miss by not returning PBRDY_ nor update the tag from Shared to Modified. PCON needs to modify to support this feature since the current CMC does not use the PEWBE_. However, there are a few conditions that may cause memory inconsistency problems. They are described as follow:

1) When the L2C stalls the subsequent write while a write cycle is already posted, a snoop may occur and hit to the same line as the pending subsequent write. For example, the subsequent CPU write is a cache hit to Shared but the CPUTCON is not allowed to update the tag from S to M until the posted write is emptied first. Meanwhile, the external snoop may invalidate the line from S to I. PCON needs to keep track of the condition or back-off the subsequent write until the posted write is emptied.

2) When the L2C stalls the subsequent write while a write cycle is already posted, a snoop may occur and hit to the same line as the pending subsequent write. For example, the subsequent CPU write is a cache hit to Modified but the CPUTCON is not allowed to update the data cache RAMs until the posted write is emptied first. Meanwhile, the external snoop may invalidate the line from M to I. PCON needs to keep track of the condition or back-off the subsequent write until the posted write is emptied.

2.6. Configuration and Memory Attributes Programming (CMAP) Block

The CMAP contains cacheability attributes for memory address decoding. It also contains the selected L2C's configurations or options. The CMAP is conceptually a subset of the CMC SMAP. The goal is to minimize the software and PCON changes by maintaining the same registers and indexed addressing of these registers. However, there are several registers which are not applicable nor supported by the L2C.

2.6.1. Programming the L2C Registers

There are two 32-bit I/O registers: 0CF0-0CF3 - Control/Status Register and 0CF4-0CF7 - Data Register. An indexed I/O port scheme (similar to ISM) is selected providing software to access internal registers through Control/Status and Data registers. The software accesses internal L2C or L2D registers by writing commands to the Control/Status Register and reading or writing the Data Register. Note: Although the Control/Status is actually an 8-bit port, it will be treated like a 32-bit port as same as the Data register to simplify the logic. In addition, the extra bits can support any future expansion if required.

When software writes a write command to the Control/Status register, the specified internal register is selected for the following Data Register write. The next write to the Data Register stores the write as defined for the selected register.

When software writes a Read command to the Control/Status Register, the specified internal register is selected for the following Data Register read(s). Software read(s) from the Data Register return the value(s) defined for the selected register.

2.6.2. Control/Status Register Commands - Port 0CF0-0CF3h

| Offset | L2C Configuration Register Name |
|--------|--------------------------------|
| 000h   | Vendor ID - low byte           |
| 001h   | Vendor ID - high byte          |
| 002h   | Device ID - low byte           |
| 003h   | Device ID high byte            |

| Offset | L2C Configuration Register Name |
|---|---|
| 006h | Status - low byte |
| 007h | Status - high byte |
| 008h | Revision ID |
| 009-00Ch | Reserved |
| 00Dh | Latency Timer |
| 00Eh | Header |
| 00Fh | Reserved (BIST Register) |
| 010-037h | Reserved |
| 038-03Bh | Latched Processor Address on L2D error |
| 03C-03Fh | Latched Host Address on L2D error |
| 040-043h | L2D Configuration/Parity |
| 044-045h | Special Cycle Address |
| 046h | Reserved |
| 04Fh | Reserved |
| 050h | Host CPU Selection |
| 051h | Reserved (Deturbo Frequency Control) |
| 052h | Secondary Cache Control |
| 053h | NOPOST Counter |
| 054h | PCI Read/Write Buffer Control |
| 054h | Miscellaneous Control |
| 057h | DRAM / Posting Controller Mode |
| 059h | Programmable Attribute Map - 0 |
| 05Ah | Programmable Attribute Map - 1 |
| 05Bh | Programmable Attribute Map - 2 |
| 05Ch | Programmable Attribute Map - 3 |
| 05Dh | Programmable Attribute Map - 4 |
| 05Eh | Programmable Attribute Map - 5 |
| 05Fh | Programmable Attribute Map - 6 |
| 060h | DRAM Row Boundary - Bank 0 |
| 061h | DRAM Row Boundary - Bank 1 |
| 062h | DRAM Row Boundary - Bank 2 |
| 063h | DRAM Row Boundary - Bank 3 |
| 064h | DRAM Row Boundary - Bank 4 |
| 065h | DRAM Row Boundary - Bank 5 |
| 066h | DRAM Row Boundary - Bank 6 |
| 067h | DRAM Row Boundary - Bank 7 |
| 068-06Fh | Reserved (for future DRAM expansion) |
| 070h | Error - Command |
| 071h | Error - Status |
| 072h | SMI Control Register |
| 073-077h | Reserved |
| 078-079h | Memory Space Gap Register 0 |
| 07C-07Fh | VGA Range Buffer Attribute Register |
| 080-081h | Reserved (TAG Test Index) |
| 082-083h | Reserved |
| 084-086h | Reserved (TAG test Data) |
| 087-0FFh | Reserved |

Note: Only the PD[7:0] are valid during writing a command to the Control/Status register.

2.6.3. Data Register Commands - Port 0CF4-0CF7h

The following table outlines all of the Configuration Registers of the CMC and L2C. The Configuration Registers are only accessible by L2C configuration cycles. Shaded offsets represent registers used by the CMC but not supported by the L2C.

Register Reference Table

| Offset | CMC Configuration Register Name | L2C Configuration Register Name | CMC | L2C |
|---|---|---|---|---|
| 00h | Vendor ID - low byte | Vendor ID - low byte | Y | Y |
| 01h | Vendor ID - high byte | Vendor ID - high byte | Y | Y |
| 02h | Device ID - low byte | Device ID - low byte | Y | Y |
| 03h | Device ID high byte | Device ID high byte | Y | Y |
| 06h | Status - low byte | Status - low byte | Y | N |
| 07h | Status - high byte | Status - high byte | Y | N |
| 08h | Revision ID | Revision ID | Y | Y |
| 09-0Ch | Reserved | Reserved | - | - |
| 0Dh | Latency Timer | Latency Timer | Y | Y |
| 0Eh | Header | Header | - | - |
| 0Fh | Reserved (BIST Register) | Reserved (BIST Register) | N | N |
| 10-37h | Reserved | Reserved | - | - |
| 38-3Bh | Latched Processor Address on DMC error | Latched Processor Address on L2D error | Y | Y |
| 3C-3Fh | Latched Memory Address on DMC error | Latched Host Address on L2D error | Y | Y |
| 40-43h | DMC Configuration/Parity | L2D Configuration/Parity | Y | Y |
| 44-45h | Special Cycle Address | Special Cycle Address | N | N |
| 46h | Reserved | Reserved | - | - |
| 4Fh | Reserved | Reserved | - | - |
| 50h | Host CPU Selection | Host CPU Selection | Y | Y |
| 51h | Reserved (Deturbo Frequency Control) | Reserved (Deturbo Frequency Control) | N | N |
| 52h | Secondary Cache Control | Secondary Cache Control | Y | Y |
| 53h | NOPOST Counter | NOPOST Counter | Y | Y |
| 54h | PCI Read/Write Buffer Control | PCI Read/Write Buffer Control | N | N |
| 54h | Miscellaneous Control | Miscellaneous Control (new definition added) | Y | Y |
| 57h | DRAM / Posting Controller Mode | DRAM / Posting Controller Mode | Y | Y |
| 59h | Programmable Attribute Map - 0 | Programmable Attribute Map - 0 | Y | Y |
| 5Ah | Programmable Attribute Map - 1 | Programmable Attribute Map - 1 | Y | Y |
| 5Bh | Programmable Attribute Map - 2 | Programmable Attribute Map - 2 | Y | Y |
| 5Ch | Programmable Attribute Map - 3 | Programmable Attribute Map - 3 | Y | Y |
| 5Dh | Programmable Attribute Map - 4 | Programmable Attribute Map - 4 | Y | Y |
| 5Eh | Programmable Attribute Map - 5 | Programmable Attribute Map - 5 | Y | Y |
| 5Fh | Programmable Attribute Map - 6 | Programmable Attribute Map - 6 | Y | Y |
| 60h | DRAM Row Boundary - Bank 0 | DRAM Row Boundary - Bank 0 | Y | Y |
| 61h | DRAM Row Boundary - Bank 1 | DRAM Row Boundary - Bank 1 | Y | Y |
| 62h | DRAM Row Boundary - Bank 2 | DRAM Row Boundary - Bank 2 | Y | Y |
| 63h | DRAM Row Boundary - Bank 3 | DRAM Row Boundary - Bank 3 | Y | Y |
| 64h | DRAM Row Boundary - Bank 4 | DRAM Row Boundary - Bank 4 | Y | Y |
| 65h | DRAM Row Boundary - Bank 5 | DRAM Row Boundary - Bank 5 | Y | Y |

| Offset | CMC Configuration Register Name | L2C Configuration Register Name | CMC | L2C |
|---|---|---|---|---|
| 66h | DRAM Row Boundary - Bank 6 | DRAM Row Boundary - Bank 6 | Y | Y |
| 67h | DRAM Row Boundary - Bank 7 | DRAM Row Boundary - Bank 7 | Y | Y |
| 68-6Fh | Reserved (for future DRAM expansion) | Reserved (for future DRAM expansion) | - | - |
| 70h | Error - Command | Error - Command | Y | Y |
| 71h | Error - Status | Error - Status | Y | Y |
| 72h | SMI Control Register | SMI Control Register | Y | Y |
| 73-77h | Reserved | Reserved | Y | Y |
| 78-79h | Memory Space Gap Register 0 | Memory Space Gap Register 0 | Y | Y |
| 7C-7Fh | VGA Range Buffer Attribute Register | VGA Range Buffer Attribute Register | Y | Y |
| 80-81h | Reserved (TAG Test Index) | Reserved (TAG Test Index) | N | N |
| 82-83h | Reserved | Reserved | - | - |
| 84-86h | Reserved (TAG test Data) | Reserved (TAG test Data) | N | N |
| 87-FFh | Reserved | Reserved | - | - |

Legend
Y - Yes
N - No

```
Vendor ID Register offset 00-01h
     Bits[15:0]     Vendor ID (read only)
                         0E11h                                    (compressed CPQ)
```

```
Device ID Register offset 02-03h
     Bits[15:0]     Device ID (read only)
                         1000h
```

```
Revision ID Register offset 08h
     Bits[7:0]      Revision ID (read only)
                         00000000b                                (for L2C-1)
```

```
Latency Timer offset 0Dh
     Bits[7:0]      Latency Timer Value.
                    Defines the number of PCI clocks after GNT_ is negated before
                    terminating a burst transaction
                         20h*                                     (default)
```

```
Header register offset 0Eh
     Bits[7:0]      Standard Header (read only)
                         00h
```

```
BIST register offset 0Fh
      Bits[7:0]       BIST not supported (read only)
                        00h
```

```
Latched Processor Address on L2D Error offset 38-3Bh
      Bits[31:28]     Reserved
      Bits[27:04]     Latched Processor Address
                      If a L2D parity error occurs, the processor address from a cycle that
                      may have caused the parity error is stored in this latch. The address
                      will remain latched until this port is written to clear the latch. This
                      port is only valid if the L2D detects a PD bus error.
      Bits[3:0]       Reserved
```

```
Latched Host Address on L2D Error offset 3C-3Fh
      Bits[31:28]     Reserved
      Bits[27:03]     Latched Host Address (power up all 0s)
                      If a L2D parity error occurs, the cache controller address from a cycle that may
                      have caused the parity error is stored in this latch. The address will remain latched
                      until this port is written to clear the latch. This port is only valid if the L2D detects
                      a HD bus error.
      Bits[2:0]       Reserved
```

```
L2D Configuration / Parity Register, offset 40-43h
      Note: This register is actually in the L2D. It is shown here for documentation only.
      A parity error is indicated by setting a "1" in a Parity Check bit.
      Bit 31          PD bus Byte 3 (P5)
      Bit 30          PD bus Byte 2 (P5)
      Bit 29          PD bus Byte 7 (P5)
      Bit 28          PD bus Byte 6 (P5)
      Bit 27          HD bus Byte 3 Parity Check
      Bit 26          HD bus Byte 2 Parity Check
      Bit 25          HD bus Byte 7 Parity Check
      Bit 24          HD bus Byte 6 Parity Check
      Bits[23:16]     L2D1 scan chain register
      Bit 15          PD bus Byte 1 (P5)
      Bit 14          PD bus Byte 0 (P5)
      Bit 13          PD bus Byte 5 (P5)
      Bit 12          PD bus Byte 4 (P5)
      Bit 11          HD bus Byte 1 Parity Check
      Bit 10          HD bus Byte 0 Parity Check
      Bit 09          HD bus Byte 5 Parity Check
      Bit 08          HD bus Byte 4 Parity Check
      Bits[7:0]       L2D0 scan chain register
```

```
Host CPU Selection offset 50h
    Bit 7       CPU Type (read only)
                1 = Pentium family (Pentium, P54C, P54CM, P54CT)
    Bit 6       PCACHE Valid
                0 = PCACHE is used by this processor (P54C, "D" 486, P24T)
    Bit 5       Pipelining Disable (Pentium only)
                0 = Pipelining enabled*
                1 = Pipelining disabled
    Bit 4       Short Flush
                0 = Normal flush*
                1 = Only flush lower 16 indexes of both ways of L2.
    Bit 3       L1 Cache Write Policy
                1 = Write-back*
    Bit 2       Primary (L1) Cache Enable
                0 = L1 disabled*
                1 = L1 enabled
    Bits[1:0]   CPU clock frequency (read only)
                10 = 50MHz (aliases 60MHz for PCMC)
                11 = Reserved (66MHz)
```

```
Secondary Cache Controller Mode offset 52h
    Bits[7:6]   Way Prediction Select
                00 = Always assume Way Hit (zero wait state)
                01 = Use LRU Way Prediction*
                10 = Use Last Code read Way Prediction
                11 = Use Last Code or Data read Way Prediction
    Bit 5       SRAM type
                1 = Burst SRAM*
    Bit 4       Secondary Cache Size
                1 = 256KB (486), 512KB (P54c)*
    Bits[3:2]   Bank and Associativity
                10 = 2-way, 2 bank cache
                11 = reserved
    Bit 1       Secondary Cache Write Policy
                0 = Write-through
                1 = Write-back*
    Bit 0       Secondary (L2) Cache Enable
                0 = L2 disabled*
                1 = L2 enabled
```

```
NOPOST Counter offset 53h
    Bits[7:0]      NOPOST Counter
                   This eight bit register stores the NOPOST Counter value used by
                   QCON or HCON.
                   00h*
```

```
Miscellaneous Control Register offset 54h
    Bit 5          Soft PCI Reset (write only)
                   1 = Generate a 40 PCI clock PCI Reset (clears automatically)
    Bit 4          CPU Wait State
                   0 = Do not add an initial wait state
                   1 = Add one wait state for address decoding
    Bit 3          Twin Peaks Mode
                   0 = Twin Peaks mode disabled*
                   1 = Twin Peaks mode enabled
    Bit2           L2C Cache Line Size Mode
                   0 = 32 byte/line
                   1 = 64 byte/line
    Bit1           Twin Peaks CPU Type (read only)
                   0 = non-APIC CPU (K5 and K6)
                   1 = APIC CPU (Pentium, P54C, P54CT, P55C, P54CS, P54CST and P55CT)
    Bit0           Reserved
```

```
DRAM / Posting Control offset 57h
    Bit 4          DRAM Page Size
                   0 = 4KB page size
                   1 = 8KB page size*
    Bit 2          Processor to Memory Write Posting Enable
                   0 = Memory write posting disabled
                   1 = Memory write posting enabled*
    Bit 1          Processor to PCI Write Posting Enable
                   0 = PCI write posting disabled
                   1 = PCI write posting enabled*
    Bit 0          Allocate Data Writes
                   1 = Allocate on writes*
```

2.6.4.  Programmable Attribute Map Registers

The Programmable Attribute Map (PAM) Registers are used to control access to system memory or PCI memory for the ISA expansion addresses (00080000h - 000FFFFFh). There are seven PAM registers, with each controlling one or two sections of the ISA expansion space.

The first PAM register controls 00080000h - 0009FFFFh, which is usually system RAM in most machine although some systems will configure ISA boards here; and 000F0000h - 000FFFFFh, the system ROM, which is typically copied to RAM. The remaining six PAM registers control the rest of the ISA expansion space, 000C0000h - 000EFFFFh. This space is divided into 16KB or 32KB blocks. This granularity is required for PCI ROMs, which may exist in the ISA expansions space and be copied to RAM. Refer to the Configuration registers section for the complete PAM register set.

The L2C needs to decode the Cache Enable bits of the PAM registers to determine the cacheability. Other bits are not applicable and ignored by the L2C PCON.

The format for the Programmable Attribute Map registers follows:

```
Programmable Attribute Map
     Bits[7:4]      ISA Expansion Space 1
                    Bit 7 = PCI Enable - allows PCI bus to access DRAM at this address
                    Bit 6 = Cache Enable - allows this address to be cached
                    Bit 5 = Write Enable - allows DRAM to be written at this address
                    Bit 4 = Read Enable - allows DRAM to be read at this address
     Bits[3:0]      ISA Expansion Space 2
                    Bit 3 = PCI Enable - allows PCI bus to access DRAM at this address
                    Bit 2 = Cache Enable - allows this address to be cached
                    Bit 1 = Write Enable - allows DRAM to be written at this address
                    Bit 0 = Read Enable - allows DRAM to be read at this address
```

Read Enable - when this bit is set, the processor will read DRAM from this address. If the PCI Enable bit is set, then PCI reads from this address will also read DRAM. When this bit is cleared, both the processor and PCI masters will read from the PCI bus for this address.

Write Enable - when this bit is set, writes to this address by the processor will be directed to DRAM. If the PCI Enable bit is set, then PCI writes to this address will also write DRAM. When this bit is cleared, both the processor and PCI masters will write to the PCI bus for this address.

Cache Enable - when this bit is set, this address space is cacheable. Since the CMC does not cache PCI memory, this bit should only be set if Read Enable (at least) is set. If Read Enable is not set, then Cache Enable is ignored.

PCI Enable - when this bit is set, then PCI masters may access this address space. In this case, Read Enable and Write Enable also apply to the PCI master access. When this bit is cleared, PCI master accesses to this address space always go to the PCI bus. When Read Enable and Write Enable are both cleared, PCI Enable has a second meaning. In this case, if the PCI Enable bit is set, it indicates that the address resides on the PCI bus, and not on the EISA bus.

The following table shows all combinations of the four bits:

| PE | CE | WE | RE | CPU Accesses | PCI Master Accesses |
|---|---|---|---|---|---|
| 0 | 0 | 0 | 0 | Read and write from PCI/EISA bus, NCA | Read and write from PCI/EISA bus |
| 0 | 0 | 0 | 1 | Read from DRAM, write to WP, NCA | Read and write from PCI/EISA bus |
| 0 | 0 | 1 | 0 | Read from PCI, write to DRAM, NCA | Read and write from PCI/EISA bus |
| 0 | 0 | 1 | 1 | Read and write from DRAM, NCA | Read and write from PCI/EISA bus |
| 0 | 1 | 0 | 0 | illegal combination | illegal combination |
| 0 | 1 | 0 | 1 | Read from DRAM, write to WP, cacheable | Read and write from PCI/EISA bus |
| 0 | 1 | 1 | 0 | illegal combination | illegal combination |
| 0 | 1 | 1 | 1 | Read and write from DRAM, cacheable | Read and write from PCI/EISA bus |
| 1 | 0 | 0 | 0 | Read and write from PCI bus, NCA | Read and write from PCI bus |
| 1 | 0 | 0 | 1 | Read from DRAM, write to WP, NCA | Read from DRAM, write to PCI/EISA (master abort) |
| 1 | 0 | 1 | 0 | Read from PCI, write to DRAM, NCA | Read from PCI/EISA, write to DRAM |
| 1 | 0 | 1 | 1 | Read and write from DRAM, NCA | Read and write from DRAM |
| 1 | 1 | 0 | 0 | illegal combination | illegal combination |
| 1 | 1 | 0 | 1 | Read from DRAM, write to WP, cacheable | Read from DRAM, write to PCI/EISA (master abort) |
| 1 | 1 | 1 | 0 | illegal combination | illegal combination |
| 1 | 1 | 1 | 1 | Read and write from DRAM, cacheable | Read and write from DRAM |

Note that when RE and WE are both cleared that PE then is used to determine if the address is located on the PCI bus or the EISA bus. The CMC uses this to determine the write posting depth in the P2I Queue.

2.6.5. Local Memory Decode

The L2C generates a Local Memory decode for all memory cycles. Memory that is not decoded as local is assumed to be on the PCI/EISA busses. The L2C defines memory address as cacheable if it is decoded as local memory or the cache enable bit of PAM is set. Local Memory is all memory below the top of Memory Plug 1 that is not excluded by either a memory gap register or a PAM register.

Loc_Mem = (PA[27:20] =< DRAM Row Bank 7) & !Mem_Gap0 & !Mem_Gap1
        & !(!PAM.RE & !PWR + !PAM.WE & PWR)

where PAM.RE and PAM.WE are the Read Enable and Write Enable bits of the Programmable Attribute Map Register that corresponds to the current address.

2.6.6. System Configuration

System Configuration is reflected in the Host CPU Selection register, shown below. There are two configuration bits, which are sampled on the CPUDCD[1:0] pins at the falling edge of PRESET.

```
Host CPU Selection offset 50h
    Bit 7           CPU Type (read only)
                    1 = Pentium family (Pentium, P54C, P54CM, P54CT)
    Bit 6           PCACHE Valid
                    0 = PCACHE is not used by this processor
                    1 = PCACHE is used by this processor (i.e. P24T)
    Bit 5           Pipelining Disable (Pentium only)
                    0 = Pipelining enabled*
                    1 = Pipelining disabled
    Bit 4           Short Flush
                    0 = Normal flush*
                    1 = Only flush lower 16 indexes of both ways of L2.
    Bit 3           L1 Cache Write Policy
                    0 = Write-through
                    1 = Write-back*
    Bit 2           Primary (L1) Cache Enable
                    0 = L1 disabled*
                    1 = L1 enabled
    Bits[1:0]       CPU clock frequency (read only)
                    10 = 50MHz or 60MHz (aliases 60MHz for PCMC)
                    11 = Reserved (66MHz)
```

2.7. Error Support

2.7.1. CPU Parity Errors

The L2C samples PCHK_ from the CPU two clocks following BRDY_ for an L2 cache read hit to determine if an L2 cache parity error ever occurs. In addition, the L2C also samples PCHK_ during read allocate to determine if a parity error ever occurs on the CPU bus. The CMC only samples PCHK_ during an L2 cache read hit.

Whenever the L2C samples a PCHK_ error, it sets bit 2 of the Error - status port at offset 71h. The Latched Processor Address on L2D error register should contain a valid PA address following an L2 cache read hit error.

2.7.2. Error registers

Parity Error information is stored in several ports. The Error Status Port, configuration offset 71h, defines the source of the parity error. If a parity error is determined to be a L2D parity error, then configuration offsets 38h-3Fh, and 40-43h define exact information on the parity error.

L2D errors are never masked by the Error - Command port (in offset 70h). A L2D error will always generate the L2DPERR_ to the L2C.

```
Error - Command offset 70h
    Bit 2           L2 cache parity (read only)
                    1 = L2 cache implements cache parity
    Bits[1:0]       Reserved (always read 0)
```

Bit 2 of the Error - Command port controls whether the L2C should assert SERR_ on an L2 cache parity error. Since the L2C always implements L2 cache parity, this bit is a read only set at "1". L2 cache parity errors are only detected on L2 cache read hits.
All SERR_ and PERR_ command signals are further qualified with the global enable bits in the Command Port at offset 04h-05h.

```
Error - Status offset 71h
    Bit 7           Reserved
    Bit 3           L2C has detected a L2D parity error (read only)
                    0 = L2D parity error not detected*
                    1 = L2D parity error detected
    Bit 3           Clear L2D parity error
                    0 = clear L2D parity error
                    1 = do not clear L2D parity error
    Bit 2           L2 cache parity error (read only)
                    0 = no L2 cache parity error detected*
                    1 = L2 cache parity error detected
    Bit 2           Clear L2 cache parity error (write only)
                    0 = clear L2 cache parity error*
                    1 = do not clear L2 cache parity error
    Bit 1           L2 writeback parity error (read only)
                    0 = Latched Address corresponds to an L1 writeback*
                    1 = Latched Address corresponds to an L2 writeback
    Bit 0           Reserved
```

When set, bit 3 indicate the L2C has received a parity error signal from the L2D. The L2D checks parity on processor writes to the L2D, L2 writebacks to the L2D, and memory reads to either the processor or PCI. Writing a "0" to this bit clears the error register.

When set, bit 2 indicates the L2C has received an L2 cache read hit parity error from the processor. The L2C monitors the processor PCHK_ signal for second level cache read hits and sets this bit if a PCHK_ is sampled following an L2 read hit. Writing a "0" to this bit clears the error register.

2.8. Reset Logic

The CMC is responsible for generating the resets for the entire system. The CMC gets PWRGOOD in, which it uses to generate the resets out.

PWRGOOD is an asynchronous input signal indicating to the CMC that Vcc (5V and 3.3V) is stable. While PWRGOOD is negated, the CMC asserts PRESET and PCIRST. When PWRGOOD asserts, PCIRST negates on the next rising PCI clock edge.

The L2C does not force any processor to run BIST. Thus AHOLD and INIT are both negated during reset.

Soft resets are accomplished with the SRESET/INIT pin. This pin operates slightly differently for 486 mode and P54c mode. These are detailed in the sections on soft resets in the PCON description.

3. Signal Specification

3.1. Signal Group Definition

The L2C uses a total of 174 (vs. 190 for CMC) signal pins. The following table describes detailed descriptions of each pin. The type column indicates the function of the pin as described below.

3.1.1. Processor Interface

| Signal Name | Quantity | Type | Description |
| --- | --- | --- | --- |
| PA[31:03] | 29 | B | Processor Address for all processors supported. PA03 is also used for INV to the processors. |
| PBE[7:0]_ | 8 | I | Processor Byte Enables [7:0] |
| PADS_ | 1 | I | Processor Address Strobe input. |
| PMIO | 1 | I | Processor Memory/IO input. |
| PDC | 1 | I | Processor Data/Code input. |
| PWR | 1 | I | Processor Write/Read input. |
| PLOCK_ | 1 | I | Processor LOCK# input. |
| PCACHE_ | 1 | IU | Processor CACHE# input. |
| PKEN_ | 1 | O | Processor Cache Enable output. |
| PWBWT | 1 | O | Processor Write-Back/Write-Through Policy output for the processors. |
| PPCD | 1 | I | Processor Page Cache Disable input. |
| PPWT | 1 | I | Processor Page Write-Through input. |
| PAHOLD | 1 | O | Processor Address Hold output. |
| PBOFF_ | 1 | O | Processor Back-Off output. |
| PBRDY_ | 1 | O | Processor BRDY# ouput. |
| PEADS_ | 1 | O | Processor EADS# ouput for CPU snooping. |
| PHITM_ | 1 | IU | Processor Hit-to-Modified input for the processors. This input has a pull-up. |
| PNA_ | 1 | O | Processor Next-Address ouput to the processor. |
| PPCHK1_ | 1 | I | Processor Parity Check input. |

| | | | |
|---|---|---|---|
| PRESET | 1 | O | Processor Reset output. |
| PSMIA_ | 1 | IU | Processor System Power Management mode input for the processors. |
| PSCYC | 1 | I | Split Locked Cycle Indication. Valid only with PLOCK_. |
| PEWBE_ | 1 | O | External write buffer empty. It is used to hold off all subsequent writes to all E or M-state lines in the L1 data cache until all posted write cycles have been written back to memory. This signal is required to maintain strong write ordering. |
| Subtotal | 58 | | |

3.1.2. L2 Cache Interface

| | | | |
|---|---|---|---|
| TAGA0 | 1 | I | Tag Address 0. This is connected to PA17 in P54c mode. This input is used to eliminate an internal mux inside the L2C. |
| CADS0_ | 1 | O | Cache Address Strobe to the L2 WAY[0] Burst RAMs. |
| CADS1_ | 1 | O | Cache Address Strobe to the L2 WAY[1] Burst RAMs. |
| CADV0_ | 1 | O | Cache Advance Strobe to L2 WAY[0] Burst RAMs. |
| CADV1_ | 1 | O | Cache Advance Strobe to L2 WAY[1] Burst RAMs. |
| CCS0_ | 1 | O | Cache Chip Selects for L2 WAY[0] Burst RAMs. |
| CCS1_/SBWAY | 1 | O | Cache Chip Selects for L2 WAY[1] Burst RAMs. In single bank 2-way set associative mode, this pin is used as the way select line to the cache RAMs. This signal is connected to the most significant address line of the cache RAMs. |
| COE0_ | 1 | O | Cache Output Enable for L2 WAY[0] Burst RAMs. |
| COE1_ | 1 | O | Cache Output Enable for L2 WAY[1] Burst RAMs. |
| CWE[7:0]_ | 8 | O | Cache Write Enables for L2 BurstRAMs. |
| Subtotal | 17 | | |

3.1.3. Host Bus Interface

| | | | |
|---|---|---|---|
| HA[31:03] | 29 | B | Hostbus Address. HA03 is also used for INV to the processors/caches in Twin Peaks mode. |
| HBE[7:0]_ | 8 | O | Hostbus Byte Enables [7:0] |
| HADS_ | 1 | B | Hostbus Address Strobe signal. |
| HMIO | 1 | O | Hostbus Memory/IO* signal. |

| | | | |
|---|---|---|---|
| HDC | 1 | O | Hostbus Data/Code* signal. |
| HWR | 1 | O | Hostbus Write/Read* signal. |
| HLOCK_ | 1 | O | Hostbus LOCK* signal. |
| HCACHE_ | 1 | B | Hostbus CACHE* signal. |
| HKEN_ | 1 | I | Hostbus Cache Enable input. |
| HNA_ | 1 | I | Hostbus Next Address input. It's used as a bus guaranteed transfer by the PCON to start a line replacement writeback cycle during a read allocate cycle. HNA_ is used as an indicator that CMC won't assert the HBOFF_ to abort the current bus cycle. HNA_ is not used to pipeline or support up to 2 hostbus cycles. |
| HAHOLD | 1 | I | Hostbus Address Hold input from CMC. |
| HBOFF_ | 1 | I | Hostbus Back-Off input from CMC. |
| HBRDY_ | 1 | I | Hostbus BRDY* input. |
| HEADS_ | 1 | I | Hostbus EADS* input from the memory controller for CPU/L2C snooping. |
| HHITM_ | 1 | O | Hostbus Hit-to-Modified cacheline output for the CMC. |
| HSNPREQ_ | 1 | I | Hostbus snoop request. Input from the CMC in Twin Peaks mode indicating that a snoop cycle will start on the next rising clock unless SNPOK is already negated. |
| SNPOK | 1 | O | Hostbus snoop okay indicator. Allows the CMC to run a PCI snoop cycle if pending. |
| HSNPVLD_ | 1 | O | Hostbus snoop valid output to PCHK1L of CMC. |
| Subtotal | 53 | | |

3.1.4. Dual-Processing Interface

| | | | |
|---|---|---|---|
| BREQOUT_ | 1 | O | Host bus request output driven by the current non-master or slave to request for the host bus. The current bus master used this signal to begin arbitrattion when appropriate. |
| BREQAIN_ | 1 | O | Host bus request input signal. |
| BREQBIN_ | 1 | O | Host bus request input signal. |
| BREQCIN_ | 1 | O | Host bus request input signal. |
| BGRNTIN_ | 1 | I | Host bus grant input signal driven by the current bus master to grant the host bus to next master after the current host bus is completed. |

| | | | |
|---|---|---|---|
| BGRNTAOUT_ | 1 | O | Host bus grant output signal. |
| BGRNTBOUT_ | 1 | O | Host bus grant output signal. |
| BGRNTCOUT_ | 1 | O | Host bus grant output signal. |
| XHITM_ | 1 | B | Cross-CPU snoop hit-to-modified cacheline indicator. It is driven by the current LRM and used by the current MRM to maintain local cache consistency. |
| SNPVLDOUT_ | 1 | O | Cross-CPU snoop status valid indicator. It is driven by the current non-master to inform the current MRM that a valid snoop status is ready and valid to sample. |
| SNPVLDAIN_ | 1 | I | Cross-CPU snoop status valid input. It is driven by the current non-master to inform the current MRM that a valid snoop status is ready and valid to sample. |
| SNPVLDBIN_ | 1 | I | Cross-CPU snoop status valid input. It is driven by the current non-master to inform the current MRM that a valid snoop status is ready and valid to sample. |
| SNPVLDCIN_ | 1 | I | Cross-CPU snoop status valid input. It is driven by the current non-master to inform the current MRM that a valid snoop status is ready and valid to sample. |
| XINV | 1 | B | Cross invalidate signal. It is driven by the current host bus master to indicate to the LRM that the current host bus read is a write allocate cycle. |
| XADS_ | 1 | B | Invisible Snoop Address Strobe. |
| XNOSNP | 1 | B | Cross-CPU no snoop signal. The current host bus master indicates to LRM that the current cycle is a non-cacheable cycle. |
| Subtotal | 16 | | |

3.1.5. L2D interface

| | | | |
|---|---|---|---|
| CPUDCD[3:0] | 4 | O | Encoded CPU bus command lines for L2D. |
| HBDCD[3:0] | 4 | O | Encoded host bus command lines for L2D. |
| DATA[7:0] | 8 | B | Datapath between the L2C & L2D. It is used to transfer data from CPU data bus to L2C. |
| L2DPERR_ | 1 | I | L2D Parity Error. |
| Subtotal | 17 | | |

3.1.6. PLL Interface Signals

| | | | |
|---|---|---|---|
| CLKIN | 1 | I | Reference clock input of 66MHz for CPU-33 mode or 50MHZ for CPU-50 mode. TTL compatible levels. |

| | | | |
|---|---|---|---|
| PLLP1 | 1 | O | Phase detector output from the PLL circuit. |
| PLLP2 | 1 | I | Voltage-Controlled Oscillator (VCO) input |
| PLLVDD | 1 | I | PLL Power input |
| PLLVSS | 1 | I | PLL Ground input |
| PLLAGND | 1 | I | PLL Analog Ground input |
| Subtotal | 6 | | |

3.1.7. Miscellaneous Signals

| | | | |
|---|---|---|---|
| PWRGOOD | 1 | I | Power GOOD input used for a hard reset at boot-up. |
| FLUSH_ | 1 | I | FLUSH input signal from PMIC used to flush the cache. If asserted during power up, the internal tags will be invalidate. No writeback is needed. The signal is used in Systempro-compatible mode. Please refer to the PMIC spec for details. |
| SLEEP_ | 1 | IU | Sleep input from the PMIC. Use by the host bus arbiter to set MRM or LRM state during reset. Only connect to L2C2. When asserted, the L2C2 bus arbiter is prevented from getting the host bus. This input has a pullup. Please refer to the PMIC spec for details. |
| UO_ | 1 | O | Upgrade/OEM_ processor signal indicates to PMIC which processor is running the current host bus. When high, P2 is running the host bus cycle. When low, P1 is running the host bus cycle. PMIC uses UO_ to determine their source:INTA cycles, I/O reads and writes to 8259, and I/O reads from the Who Am I register. |
| TEST_ | 1 | I | Test input for part testing. |
| NTO | 1 | O | Nand-Tree Output for testing. |
| L2PERR_ | 1 | O | L2 Cache Subsystem Parity Error. |
| Subtotal | 7 | | |

APPENDIX B

1. Introduction

The L2 Data management ASIC is designed for use with the L2C to support various Pentium-compatible processors for use in a plug-in CPU upgrade card containing dual processors.

The L2C/L2D chip set supports processors running at 50 MHz with zero wait-state cache way prediction hit and one wait-state cache way prediction miss. In addition, it also supports processors running at 60 MHz with one wait-state cache hit. The L2C/L2D will support a limited number of L2 cache configurations depending on the selected cache size. The L2 cache is a 512KB cache configured as 2-way set associative, depending on the depth and number of cache RAMs used.

1.1. Design Overview

The design goals of the L2C/L2D chip set are to provide a very cost effective secondary cache solution with optimum performance for dual-processor mainstream servers and can support a wide range of current and next-generation Pentium-compatible microprocessors.

1.1.1. Main Features

The L2C/L2D will support only a handful of options or modes to minimize the risk factors, development time and engineering resources. The L2C/L2D have the following main features:

- Large cache size support:
  - 512 KB
  - 4K internal tags
  - 4 lines per sector
  - 4 bus transaction per line

- Zero-wait-state read hit on way prediction hit, one wait-state read hit on way prediction miss

- One-wait-state operation on CPU bus @ 60 MHz.

- Host bus will operate at 1X of CPU bus frequency

- Supports 32 byte line size only

- Supports cache-to-cache transfers (bus snarfing)

1.2. Device Description/Purpose

The L2D is a level-2 data management chip that has two Pentium-bus interfaces: processor data and host data buses. In addition, it also has a private bus to communicate with its companion chip, the L2C. The L2D is designed to operate at 1X of CPU bus frequency. The L2D interfaces directly with the Pentium CPU data and Pentium-like host data buses. The host data bus interfaces directly with the two Biners. The CMC/Biners will be used as memory controller/PCI bridge only. The L2D is implemented in a 256 BGA package.

A basic block diagram of a system incorporating the L2C/L2D chip set is shown below:

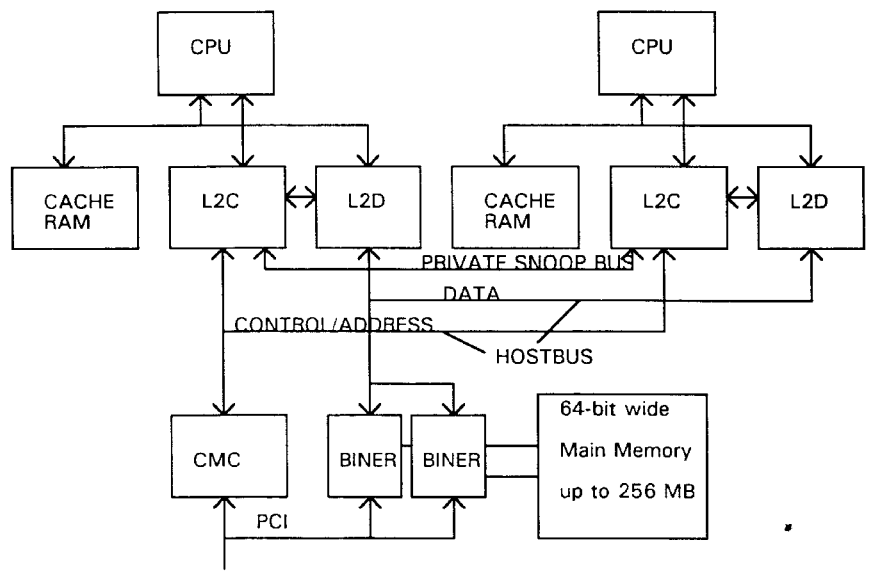

2. Design Specification

The L2C controls the L2D's internal data paths for cache misses to provide the CPU with the proper requested data. The control interface carries the necessary information from the L2C to directly inform and control the internal logic of the L2D. The CPUDCD[3:0] signals are generated by the L2C to control the data flow from the CPU data bus to one of the L2D's internal queues or from the H2PQ to the CPU data bus. In addition, the CPUDCD[3:0] also controls the data flow between the L2D and L2C. The HBDCD[3:0] signals are generated by the HCON to control the data flow from one of L2D's internal queues to the host data bus or from the host data bus to the H2PQ buffer.

There are four buffers implemented in the L2D: Snoop Writeback Queue (SWBQ), Cross-snoop writeback Queues (XWBQ), Processor to Hostbus Queue (P2HQ), Host to Processor Queue (H2PQ), and Processor Writeback Queue (PWBQ). The SWBQ buffer handles an inquire PCI snoop cycle that hit to a modified line. The SWBQ buffer contains 4x8-byte wide registers. Generally, the SWBQ buffer has the highest priority since the contents of the buffer need to be written back to CMC/Biner as soon as possible.

The XWBQ buffer handles an inquire cross-CPU snoop cycle that hit to a modified line. The XWBQ buffer contains 4x8-byte wide registers. Generally, the XWBQ buffer has the second highest priority since the contents of the buffer need to be transferred to the requesting cache as soon as possible.

The P2HQ buffer stores data from the processor data bus during a CPU-to-hostbus write cycle. This buffer acts as a temporary posted write buffer to allow fast writes from processor to memory or to PCI bus. The P2HQ buffer is logically a 1-deep and 64-bit wide. It stores up to 64 bits of a single I/O or memory write data.

On the other hand, the H2PQ buffer stores read data from the host data bus to the PD bus. The H2PQ handles CPU I/O and memory read cycles. In addition, the H2PQ buffer is also used to store an entire 32-byte line of data during a cache-to-cache transfer cycle.

The PWBQ buffers contain a total of 4X32 byte line deep. These buffers store either L1 or L2 line-replacement writeback data. The PWBQ buffers are used as a dedicated writeback buffer to temporarily store line-replacement writebacks. Thus, a cache line-fill that replaces a modified lines in the L1 data cache or up to 4 modified lines in the L2 cache can appear on the host bus first. For simplicity, the PWBQ buffers are not designed to support both L1 and L2 pending writeback cycles. Therefore, the PWBQ buffers can contain only one 32-byte of L1 or up to 4x32 or a total of 128-byte of L2 line-replacement writeback data.

2.1. Functional Block Diagram

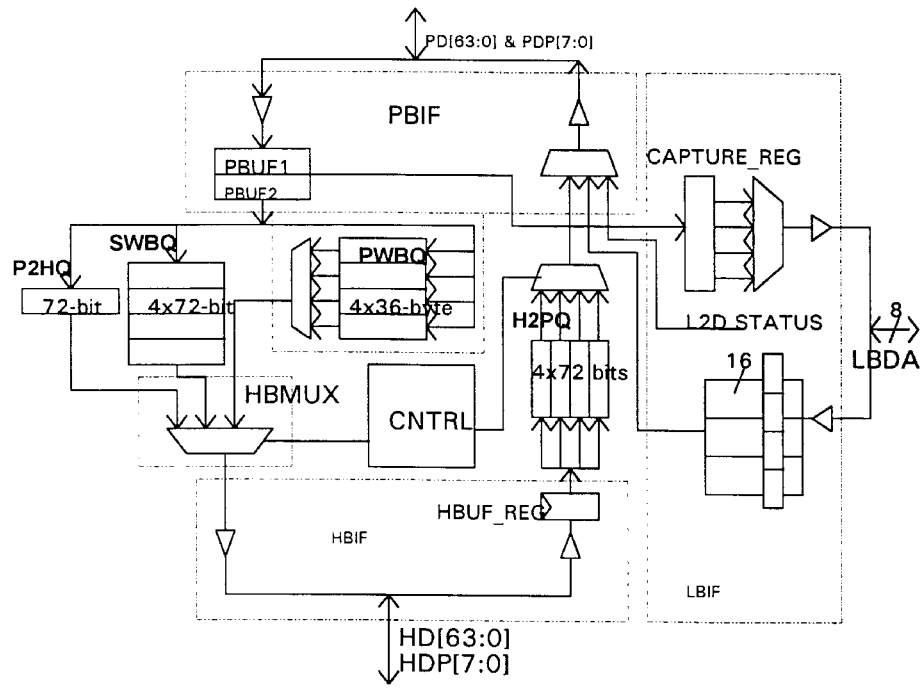

2.2. Functional Description

This section contains descriptions of each functional blocks. Each block corresponds to particular sections of the gate array Verilog HDL code.

2.2.1. Processor Bus Interface (PBIF) Module

The PBIF block interfaces directly with the processor data bus, PD[63:0], and parity PDP[7:0]. This block latches the input of PD and PDP during a processor write cycle. There are two 64-bit registers, PBUF1 and PBUF2, used by the PBIF to synchronize and store the incoming data. In addition, there are two 8-bit registers, PBUF1_PAR and PBUF2_PAR, used by the PBIF to synchronize and store the incoming parity byte.

2.2.1.1. PBUF1 Register

This is the input register from the PD bus. This register contains 64 bits of processor data. This register always latches the PD[63:0] bus on each clock boundary and pass the data directly to the PBUF2 and CAPTURE_REG registers.

2.2.1.2. PBUF1_PAR Register

This is the input register from the PDP bus. This register contains 8 bits of parity. This register always latches the PDP[7:0] on each clock boundary and pass the data directly to the PBUF2_PAR register where a parity check is done.

2.2.1.3. PBUF2 Register

This register accepts the data from the output of the PBUF1 register and passes to the appropriate queue selected by the CPUDCD command. This register also contains 64 bits of processor data. This register always latches the output of PBUF1[63:0] on each clock boundary.

2.2.1.4. PBUF2_PAR Register

This is the input register from the PDINPAR register. This register contains 8 bits of parity. This register always latches the PBUF1_PAR[7:0] on each clock boundary and pass the data directly to the appropriate register.

A parity check is done against the data in the PBUF2 register. If a parity error occurs, an output, L2DPERR, is generated to the L2C. The parity error also capture the parity check bits in the PBUF2_PAR[7:0] which is held until an L2D Status Unload is done to access the data.

2.2.2. Host Bus Interface (HBIF) Module

The HBIF block handles the host data bus, HD[63:0], and parity HDP[7:0]. This block latches the input of HD and HDP during a processor read cycle. There is one 64-bit register, HBUF, used by the HBIF to synchronize the incoming host data. In addition, there is one 8-bit register, HBUF_PAR, used by the HBIF to synchronize and check the incoming host parity byte.

2.2.3. SWBQ Module

The SWBQ is a 1x32-byte line deep queue. The SWBQ buffer is used to store a modified line due to an external PCI inquire cycle that hit to a modified line in the data cache(s). The inquire cycle can hit to modified lines in both L1 and L2 caches. In this case, the L1 data cache has the most recent data. The writeback data is saved temporarily in the SWBQ buffer. The snoop writeback will not start on the host bus until the entire modified cache line has been saved in the SWBQ buffer.

The L2C generates the SWBQ Load command via the CPUDCD interface to inform the L2D to latch the writeback data on the PD bus into the SWBQ buffer. When appropriate, the L2C issues the SWBQ Unload command via the HBDCD interface to inform the L2D to drive the stored writeback data out from the SWBQ buffer on to the host data bus.

The SWBQ buffer is organized as 4x64-bit registers. For Pentium writeback cycles, the lower 5 bits of the burst address always starts at 0. Therefore, the burst order becomes 0, 8h, 10h, and 18h, respectively.

2.2.4. XWBQ Module

The XWBQ is a 1x32-byte line deep queue. The XWBQ buffer is used to store a modified line due to a cross-CPU inquire cycle that hit to a modified line in the data cache(s). The inquire cycle can hit to modified lines in both L1 and L2 caches. In this case, the L1 data cache has the most recent data. The writeback data is saved temporarily in the XWBQ buffer. The cross-snoop writeback will not start on the host bus until the entire modified cache line has been saved in the XWBQ buffer and the host bus ownership has been granted.

The L2C generates the XWBQ Load command via the CPUDCD interface to inform the L2D to latch the writeback data on the PD bus into the XWBQ buffer. When appropriate, the L2C issues the XWBQ Unload command via the HBDCD interface to inform the L2D to drive the stored writeback data out from the XWBQ buffer on to the host data bus.

The XWBQ buffer is organized as 4x64-bit registers. For Pentium writeback cycles, the lower 5 bits of the burst address always starts at 0. Therefore, the burst order becomes 0, 8h, 10h, and 18h, respectively.

2.2.5. H2PQ Module

This module contains 4x64-bit wide queue. It stores temporarily either a single 64-bit or 32 bytes of data from the host bus. This is one of the two corresponding buffers in the L2D for the L2C's P2HQ queue. The H2PQ is used as the hostbus read buffer. This H2PQ buffer loads serially from the host bus and unloads randomly on the 64-bit or 8-byte boundary. This buffer is used to store data during a single memory or I/O read, read allocate, and cache-to-cache transfer.

2.2.6. P2HQ Module

Logically, this module contains a 72-bit wide register. It stores 64-bit data and 8 parity bits of a single memory data write (postable and non-postable) or an I/O write cycle. This is one of the two corresponding buffers for the L2C's P2HQ. The P2HQ is used as a posted write buffer.

2.2.7. PWBQ Module

This module contains 4x32 bytes of data buffers, 4x8 parity buffers and two 4:1 MUXes; pwbq_mux[63:0] and pwbq_muxp[7:0]. The PWBQ buffers are 4-line deep. It stores either L1 or L2 line-replacement writeback data. The PWBQ buffers are used as dedicated writeback data buffers to temporarily store line-replacement writebacks coming out either from L1 or L2 cache.

2.2.8. CNTRL Module

This module contains several small state machines. These state machines control the data flow within the L2D and the three interfaces; processor data bus, host data bus and the local bus between the L2C and L2D.

It uses various logic from the CPUDCD, HBDCD and a few hostbus signals to control the internal data flow.

2.2.8.1. CPUDCD Interface

The L2D CPU decoded signals are a multiplexed code, whose values are shown below:

L2D CPU Decode

| Bit Positions | Functions | Comment |
|---|---|---|
| 0 | Idle | |
| 1 | SWBQ Load | PD --> Q |
| 2 | P2HQ (CPU write) | PD --> Q |
| 3 | XWBQ Load | PD --> Q |
| 4 | PWBQ0 | PD --> Q |
| 5 | PWBQ1 | PD --> Q |
| 6 | PWBQ2 | PD --> Q |
| 7 | PWBQ3 | PD --> Q |

| Bit Positions | Functions | Comment |
|---|---|---|
| 8 | L2C Load Control | PD --> Q --> L2C |
| 9 | L2C Load Data | PD --> Q --> L2C |
| A | L2C Unload Data | L2C --> Q --> PD |
| B | L2D Status Unload | L2D Error Reg--> PD |
| C | H2PQ0 Unload | Q --> PD |
| D | H2PQ1 Unload | Q --> PD |
| E | H2PQ2 Unload | Q --> PD |
| F | H2PQ3 Unload | Q --> PD |

2.2.8.1.1. SWBQ Load

This command indicates to the L2D that a snoop writeback needs to go into the SWBQ buffer. A snoop writeback is caused by an external PCI snoop hit to a modified line either in L1 or L2 cache.

2.2.8.1.2. P2HQ

This decoded command indicates to the L2D that CPU data and parity bits from the PD bus is valid and ready to be saved in the P2HQ buffer.

2.2.8.1.3. XWBQ Load

This command indicates to the L2D that a snoop writeback needs to go into the SWBQ buffer. A snoop writeback is caused by a cross-CPU snoop hit to a modified line either in L1 or L2 cache.

2.2.8.1.4. PWBQ0-3

These decoded commands indicate to the L2D that a line-replacement writeback either from L1 or L2 cache needs to go into one of the four PWBQ buffers. The selection of these buffer is determine by the L2C based on the PA[6:5] bits. For example, the PA[6:5] are 1 and 0, the command PWBQ2 is used to inform the L2D to store the current writeback into PWBQ2 buffer.

If the line-replacement writeback is from the L1 data cache, only one of these four buffers is allowed to temporarily store the writeback data. If the line-replacement writebacks are from the L2 cache, however, potentially up to four buffers are allowed since the L2 tag may contain up to four modified lines. The number of needed PWBQ buffers to store the L2 line replacement writebacks depending on the number of modified lines that need to be replaced.

2.2.8.1.5. L2C Load Control

This command indicates to the L2D that the L2C wants to load the current configuration control cycle from the PD[31:0] bus. The command activates the *Transmit Configuration State Machine* to handle the transfer of configuration from the PD bus to the L2C via the private L2D interface. The L2D uses the CAPTURE_REG to store the least significant 32-bit output from the PBUF1. In this case, parity bits are not checked and ignored by the L2D.

The transfer takes about 8 clock cycles to complete. A single byte is transfer from the L2D to the L2C for every 2 clocks. The least significant byte or byte 0 is transferred first. A two-bit counter is used to keep track which byte will be transferred next by counting up from 0-3.

2.2.8.1.6.  L2C Load Data

This command indicates to the L2D that the L2C wants to load the current configuration data cycle from the PD[31:0] bus. The command activates the *Transmit Configuration State Machine* to handle the transfer of configuration from the PD bus to the L2C via the private L2D interface. The L2D uses the CAPTURE_REG to store the least significant 32-bit output from the PBUF1. In this case, parity bits are not checked and ignored by the L2D.

The transfer takes about 8 clock cycles to complete. A single byte is transfer from the L2D to the L2C for every 2 clocks. The least significant byte or byte 0 is transferred first. A two-bit counter is used to keep track which byte will be transferred next by counting up from 0-3.

2.2.8.1.7.  L2C Unload Data

This command indicates to the L2D that the processor wants to read the data or status of specified configuration register on the PD[31:0] bus. The command activates the *Receive Configuration State Machine* to handle the transfer of configuration from one of the L2C registers via the private L2D interface and to the PD bus. The L2D uses the RECDATA_REG to store the 32-bit output from the L2C. In this case, parity bits are not checked and ignored by the L2D.

The transfer takes about 8 clock cycles to complete. A single byte is transfer from the L2C to the L2D for every 2 clocks. The least significant byte or byte 0 is transferred first. A two-bit counter is used to keep track which byte will be transferred next by counting up from 0-3.

2.2.8.1.8.  L2D Status Unload

This command causes the L2D to unload the error status from the internal configuration register on to the PD bus.

2.2.8.1.9.  H2PQ0-3

These decoded commands are used by the L2D to move data from the H2PQ buffers to the PD bus. During a read allocate cycle or cache-to-cache transfer, the requested data are always loaded in serially from the host data bus. Normally, the requested data are always return to the PD bus in the same order as they come in. However, the requested data may have to return randomly to the PD bus if a cache-to-cache transfer or "bus snarfing" is resulted.

2.2.8.2. HBDCD Interface

This interface also controls the data flow as specified by the HBDCD[3:0] pins from the L2C. The state machine also keep track of the status of current host bus cycle by monitoring both HBRDY_ and HBOFF_ signals. The L2D hostbus decoded signals are a multiplexed code, whose values are shown below:

| Bit Positions | Functions | Comment |
|---|---|---|
| 0 | Idle (reset) | HD --> Q |
| 1 | H2PQ (rd data) | HD --> Q |
| 2 | SWBQ (unload) | Q --> HD |
| 3 | P2HQ (unload posted wr) | Q --> HD |
| 4 | PWBQ0 (unload) | Q --> HD |
| 5 | PWBQ1 (unload) | Q --> HD |
| 6 | PWBQ2 (unload) | Q --> HD |
| 7 | PWBQ3 (unload) | Q --> HD |
| 8 | XWBQ non-burst unload | Q --> HD |
| 9 | XWBQ burst unload | Q --> HD |
| 10-Fh | Reserved | |

2.2.8.2.1. H2PQ

This decoded command indicates to the L2D to load the host data into the H2PQ buffers when the requested data are valid on the host bus. The requested read data are always loaded serially into the H2PQ buffers.

2.2.8.2.2. SWBQ Unload

This decoded command informs the L2D to move the snoop writeback data from the SWBQ buffer to the host data bus. The stored writeback data are driven out in the same order that they come in. The burst order always starts at 0, 8h, 10h and 18h respectively. The HBRDY_ is sampled to determine when to drive the next subsequent data.

2.2.8.2.3. P2HQ Unload

This decoded command is used to unload the posted write data on to the host data bus.

2.2.8.2.4. PWBQ0-3 Unload

These decoded commands indicate which PWBQ line buffer needs to be unload to the host data bus accordingly. The burst order always starts at 0, 8h, 10h and 18h respectively.

2.2.8.2.5. XWBQ Non-burst Unload

This decoded command informs the L2D to move the snoop writeback data from the XWBQ buffer to the host data bus. The stored writeback data are driven out in the same order that they come in. The burst order always starts at 0, 8h, 10h and 18h respectively. The HBRDY_ is sampled to determine when to drive the next subsequent data.

2.2.8.2.6. XWBQ Burst Unload

This decoded command informs the L2D to move the snoop writeback data from the XWBQ buffer to the host data bus during an invisible snoop writeback cycle. The stored writeback data are driven out in the same order that they come in. The burst order always starts at 0, 8h, 10h and 18h respectively. The invisible snoop writeback will take a total of 4 clocks to complete the transfer. The HBRDY_ is ignored in this case.

2.2.9. Local Bus Interface (LBIF) Module

This module controls the local bus interface between the L2C and L2D. It contains a few state machines and 2-bit counters. These state machines are: receive configuration and transmit configuration.

2.2.9.1. Receive Configuration State Machine

This state machine is activated by the *L2C Unload Data* command. The state machine performs four data transfer cycles from the specified L2C register and save the received data into 32 bits register, REC_DATA_REG. Each transfer cycle takes two clocks and contains a byte or 8-bit of data. A two-bit counter controls the appropriate byte lane.

2.2.9.2. Transmit Configuration State Machine

This state machine is activated by the *L2C Load Control* or *L2C Load Data* commands. The state machine performs the transfer of configuration cycle from the PD bus to the L2C via the private L2D interface. The L2D uses the PBUF1 to store and synchronize the data from the PD bus. Then, the output of the PBUF1[31:0] is saved into the CAPTURE_REG. In this case, parity bits are not checked and ignored by the L2D.

The transfer takes about 8 clock cycles to complete. A single byte is transfer from the CAPTURE_REG to the L2C for every 2 clocks. The least significant byte or byte 0 is transferred first. A two-bit counter is used to keep track which byte will be transferred next by counting up from 0-3.

2.2.10. Host Bus Cycles

2.2.10.1. Read Allocate

A host bus read allocate will be generated when a CPU read miss occurs. The CPU read cycle cannot be serviced locally because the requested data is missing from the L2 cache. If the address is defined as cacheable, the L2C runs a cache line fill. If the address is defined as non-cacheable, the L2C runs a single host bus read instead.

If a cache line fill is executed, the returned data and parity bits from memory is latched and synchronized by the HBUF_REG. The HBUF_REG passes the data directly to H2PQ buffer without adding another clock delay. The returning burst data always store in sequential order. The H2PQ[0] stores the first returned 64 bits data.

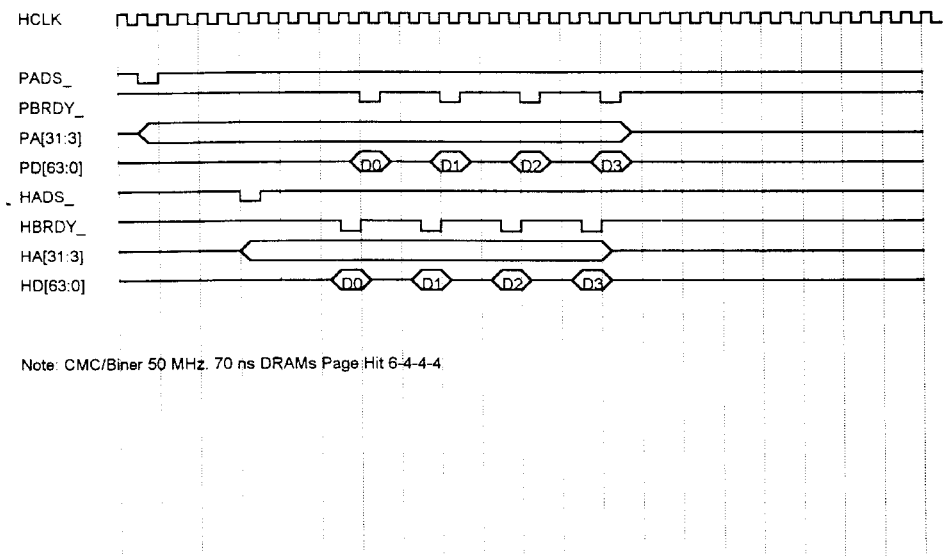

Read Allocate Cycle

Note: CMC/Biner 50 MHz. 70 ns DRAMs Page Hit 6-4-4-4

2.2.10.2. Non-Burst Write

A non-burst or single write cycle occurs when the CPU generates a write cycle and the data is not present in the L2C. The CPU write cycle is postable if the write is an I/O or non-cacheable memory. The memory write to a cacheable address is defined as non-postable. In this case, an invisible snoop cycle is run on the host bus instead.

Non-postable and Postable Write Cycles

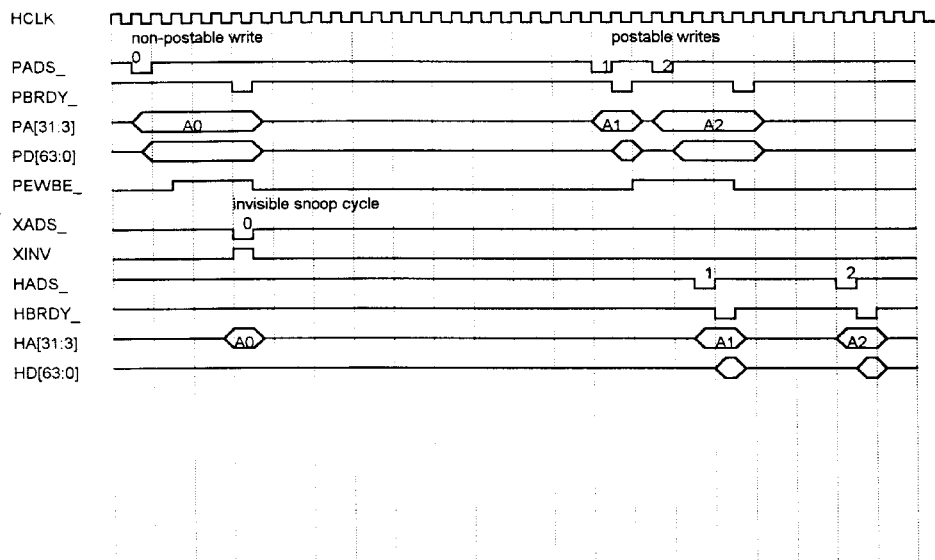

2.2.10.3. Write Allocate

If write allocation is enabled, the memory write miss is handled differently. The L2C asserts the signal PBOFF_ to abort the current write miss cycle. If the write is pipelined, the L2C allows the pending cycle to complete before asserting the PBOFF_. Once the write miss cycle is backed off, the L2C runs a write allocate on the host bus. The write allocate to the CMC is the same as read allocate. However, the XINV_ is asserted to inform the other L2C in the system to snoop and invalidate the line. When the requested line fill is returned from memory, the L2C updates the data and the tag to modified state. Then, the PBOFF_ is negated, allowing the CPU to restart the previously write miss cycle. However, this time as an L2 write to modified line. The write data is updated to the SRAMs.

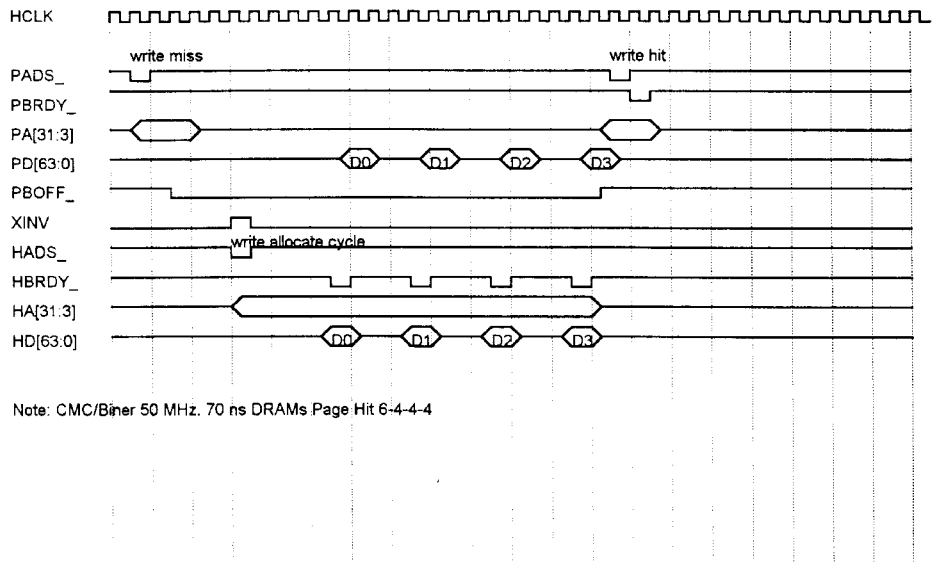

2.2.10.4. Cache-to-Cache Transfers

The L2C/L2D support cache-to-cache transfers or "bus snarfing" during a read or write allocation by transferring the requested data directly from another cache. The snooping L2C or LRM asserts the XHITM_ to inform that the current snoop cycle hit to a modified line. The current master must ignore the returned stale data from memory by not returning the PBRDY_ back to the CPU. The current MRM will grant the LRM bus ownership as soon as the current host bus has been completed. Once the bus ownership has been granted, the LRM will assume the MRM state and perform a writeback cycle to memory. The other L2C which was the MRM will become the LRM and "snarf" the requested data available on the host bus. The data is being updated in main memory as well during the cache-to-cache transfer.

If the cache-to-cache transfer caused by a read allocate cycle, the snarfing L2C will update the data to the cache SRAMs and mark the tag as shared. If the cache-to-cache transfer caused by a write allocate cycle, the snarfing L2C will update the data to the cache SRAMs and mark the tag as modified. The current MRM will change the state of the line from modified to either shared if caused by a read allocate (XINV_ negated) or invalid if caused by a write allocate cycle (XINV_ asserted).

If the XHITM_ is asserted during a host bus write to memory, the MRM needs to complete the current bogus cycle and transfer the bus ownership to the LRM. Once the bus ownership has been granted, the LRM will assume the MRM state and perform a writeback cycle to memory. After the writeback is completed, the bus ownership is switched again. Now, the MRM needs to rerun the CPU write to memory. The PCI snoop cycle is not allowed to occur until the second attempt CPU write to memory is completed.

Cache to Cache Transfer Cycle

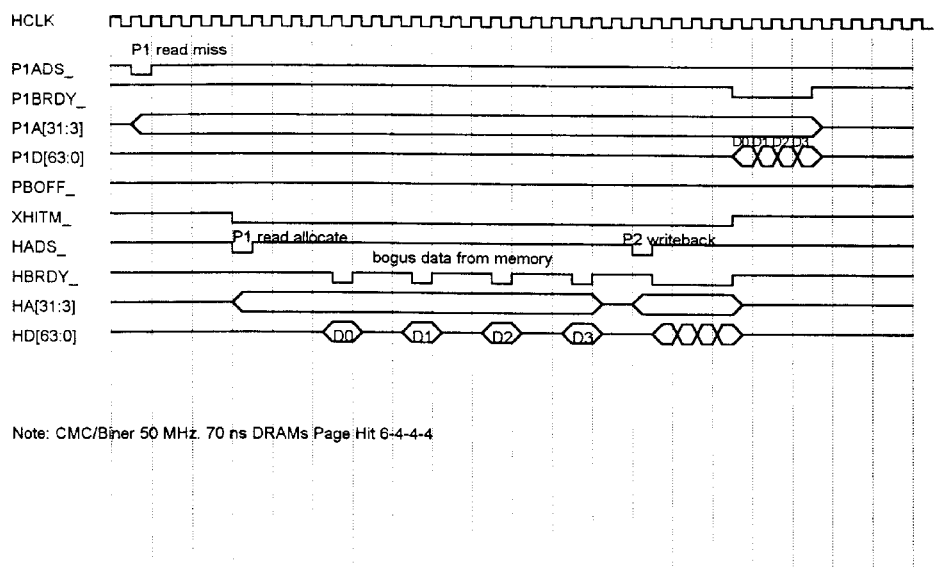

Note: CMC/Biner 50 MHz. 70 ns DRAMs Page Hit 6-4-4-4

2.2.10.5. Invisible Snoop Cycle

The invisible snoop cycle is a snoop cycle that is invisible to the CMC. Therefore, the CMC is not aware that a snoop cycle is being driven onto the host bus. The invisible snoop cycle is required only when there is more than one processor in the system. In addition, the invisible snoop cycle is used to minimize the partial write traffic to the memory subsystem. The partial write cycle will cause CMC/Biner to do a read-modify-write cycle instead to support ECC. The invisible snoop cycle allows the current bus master to maintain cache consistency without generating a partial write cycle to the memory controller.

The master L2C starts the invisible snoop cycle by driving the host address bus without asserting the HADS_ when it is safe to do so. The private XADS_ is asserted instead of HADS_ by the MRM to inform the other L2C that an invisible snoop cycle is occurring on the host bus. This will cause other caches to snoop and invalidate if present.

Invisible Snoop Cycle

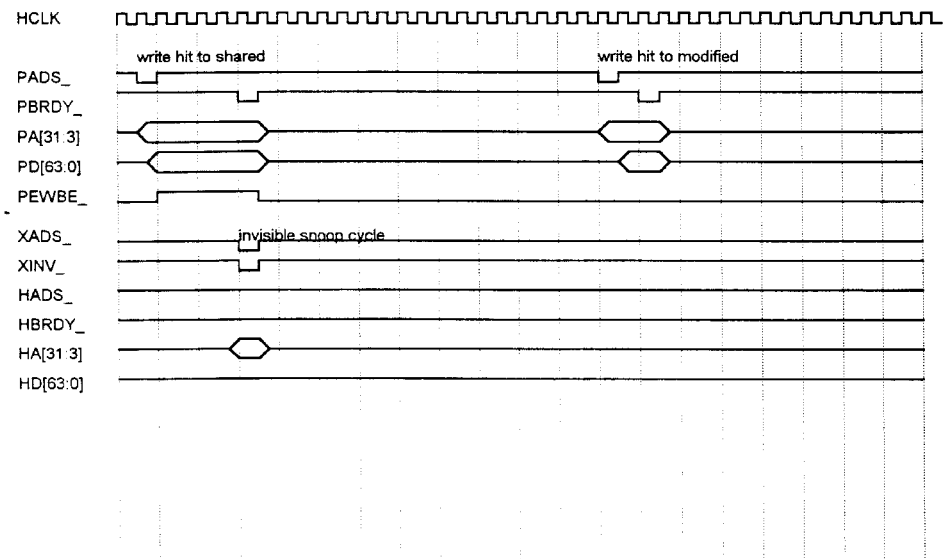

2.3. Error Support

2.3.1. CPU and Host Data Parity Errors

The L2D always checks the parity bits for in-bound data from CPU or host data bus. It also generates the parity bits for out-bound data to CPU or host data bus. The L2C samples PCHK_ from the CPU two clocks following BRDY_ for an L2 cache read hit to determine if an L2 cache parity error ever occurs. In addition, the L2C also samples PCHK_ during read allocate to determine if a parity error ever occurs on the CPU bus. The CMC only samples PCHK_ during an L2 cache read hit.

If an error is detected, the L2DPERR_ will be asserted to inform the L2C. Whenever the L2C samples a PCHK_ or L2DPERR error, it sets bit 2 of the Error - status port at offset 71h. The Latched Processor Address on L2D error register does contain a valid PA or HA address following a parity error.

2.3.2. Error registers

Parity Error information is stored in several ports. The Error Status Port, configuration offset 71h, defines the source of the parity error. If a parity error is determined to be a L2D parity error, then configuration offsets 38h-3Fh, and 40-43h define exact information on the parity error.

```
L2D Configuration / Parity Register, offset 40-43h

A parity error is indicated by setting a "1" in a Parity Check bit.
    Bit 31      PD bus Byte 3 (P5)
    Bit 30      PD bus Byte 2 (P5)
    Bit 29      PD bus Byte 7 (P5)
    Bit 28      PD bus Byte 6 (P5)
    Bit 27      HD bus Byte 3 Parity Check
    Bit 26      HD bus Byte 2 Parity Check
    Bit 25      HD bus Byte 7 Parity Check
    Bit 24      HD bus Byte 6 Parity Check
    Bits[23:16] L2D1 scan chain register
    Bit 15      PD bus Byte 1 (P5)
    Bit 14      PD bus Byte 0 (P5)
    Bit 13      PD bus Byte 5 (P5)
    Bit 12      PD bus Byte 4 (P5)
    Bit 11      HD bus Byte 1 Parity Check
    Bit 10      HD bus Byte 0 Parity Check
    Bit 09      HD bus Byte 5 Parity Check
    Bit 08      HD bus Byte 4 Parity Check
    Bits[7:0]   L2D0 scan chain register
```

*L2D errors are never masked by the Error - Command port (in offset 70h). A parity error always generates the L2DPERR_ to the L2C.*

```
Error - Status offset 71h
    Bit 3         L2C has detected a L2D parity error (read only)
                  0 = L2D parity error not detected*
                  1 = L2D parity error detected
    Bit 3         Clear L2D parity error
                  0 = clear L2D parity error
                  1 = do not clear L2D parity error
    Bit 2         L2 cache parity error (read only)
                  0 = no L2 cache parity error detected*
                  1 = L2 cache parity error detected
    Bit 2         Clear L2 cache parity error (write only)
                  0 = clear L2 cache parity error*
                  1 = do not clear L2 cache parity error
    Bit 1         L2 writeback parity error (read only)
                  0 = Latched Address corresponds to an L1 writeback*
                  1 = Latched Address corresponds to an L2 writeback
```

When set, bit 3 indicate the L2C has received a parity error signal from the L2D. The L2D checks parity on processor writes to the L2D, L2 writebacks to the L2D, and memory reads to either the processor or PCI. Writing a "0" to this bit clears the error register.

When set, bit 2 indicates the L2C has received an L2 cache read hit parity error from the processor. The L2C monitors the processor PCHK_ signal for second level cache read hits and sets this bit if a PCHK_ is sampled following an L2 read hit. Writing a "0" to this bit clears the error register.

3. Signal Specification

3.1. Signal Group Definition

The L2D uses a total of 167 signal pins. The following table describes detailed descriptions of each pin. The type column indicates the function of the pin as described below.

3.1.1. Processor Interface

| Signal Name | Quantity | Type | Description |
|---|---|---|---|
| PD[63:00] | 64 | B 8mA | Processor Data Interface. |
| PDP[7:0] | 8 | B 8mA | Processor Data Parity. |
| Subtotal | 72 | | |

3.1.2. Host Bus Interface

| | | | |
|---|---|---|---|
| HD[63:00] | 64 | B 8mA | Hostbus Data interface. |
| HDP[7:0] | 8 | B 8 mA | Hostbus Data Parity. |
| HBOFF_ | 1 | I | Hostbus Back-Off input from CMC. |
| HBRDY_ | 1 | I | Hostbus BRDY* input. |
| Subtotal | 74 | | |

3.1.3. L2D interface

| | | | |
|---|---|---|---|
| CPUDCD[3:0] | 4 | I | Encoded CPU bus command lines for L2D. |
| HBDCD[3:0] | 4 | I | Encoded host bus command lines for L2D. |
| LD[7:0] | 8 | B 4mA | Datapath between the L2C & L2D. It is used to transfer data from CPU data bus to L2C. |
| L2DPERR_ | 1 | O 8mA | L2D Parity Error. |
| Subtotal | 17 | | |

| 3.1.4. | Miscellaneous Signals | | | |
|---|---|---|---|---|
| CLOCK | 1 | I | CPU Clock input. |
| TEST_ | 1 | I | Test input for part testing. |
| NTO | 1 | O | Nand-Tree Output for testing. |
| Reset | 1 | I | System reset. |
| *Subtotal* | 4 | | |

Legend:  O - Output
I - Input
B - Bi-directional

What is claimed is:

1. A cache system for multiple processors comprising multiple level two caches, each of the level two caches serving a respective one of the processors, a main memory system, and a bus interconnecting the level two caches and the main memory system, the bus allowing data to be written directly between the level two caches without accessing the main memory system.

2. The cache system of claim 1, further comprising snoop signals connecting the multiple level two caches.

3. The system of claim 1 wherein the main memory system is accessed only once.

4. The method of claim 3 further comprising a first cache controller informing a second cache controller of the allocation cycle, and the second cache controller informing the first cache controller that the allocation cycle is accessing a stale item of data from the main memory system.

5. The method of claim 4 further comprising the first cache controller discarding the stale item of data retrieved from main memory.

6. The method of claim 3 further comprising a first cache controller writing an item of data from a first cache memory to a second cache memory.

7. The method of claim 6 further comprising a second cache controller intercepting the item of data as it is being written into the second cache memory.

8. The cache system of claim 1 further comprising two cache controllers connected by snoop signal lines.

9. The cache system of claim 8 further comprising a bus interconnecting the first cache controller and the second cache controller.

10. The cache system of claim 8 further comprising a first cache memory, access to which is controlled by the first cache controller, and a second cache memory, access to which is controlled by the second cache controller.

11. The cache system of claim 10 further comprising a bus interconnecting the first and second cache controllers and the first and second cache memories.

12. The cache system of claim 11 further comprising a main memory system.

13. The cache system of claim 12 wherein the first cache controller is capable of moving an item of data between the first cache memory and the second cache memory without accessing the main memory system.

14. The cache system of claim 13 where in the second cache controller is capable of intercepting the data as it is moved between the first cache memory and the second cache memory.

15. A cache system of claim 1 wherein an allocation cycle to a cache requires only one access to a main memory system.

16. A cache system comprising:

a level two cache memory, a main memory system, a bus interconnecting the level two cache memory and the main memory system, a first level two cache controller connected to the level two cache memory and the bus, the first level two cache controller controlling access to the level two cache memory, and a second level two cache controller capable of writing date into the level two cache memory via the bus without accessing the main memory system.

17. The cache system of claim 16 further comprising snoop signals connecting the first level two cache controller to the second level two cache controller.

18. The cache system of claim 16 further comprising a first processor connected to the first level two cache controller, and a second processor connected to the second level two cache controller.

19. The cache system of claim 18 further comprising a first level one cache serving the first processor, and a second level one cache serving the second processors.

20. A cache system comprising:

multiple processors, multiple level two caches, each of the level two caches serving a respective one of the processors, a main memory system, and a bus interconnecting the level two caches and the main memory system wherein an item of data may be written from one of the level two caches to another without accessing the main memory system.

21. A computer system, comprising:

multiple processors, multiple level two caches, each of the level two caches serving a respective one of the processors, a main memory system a first bus interconnecting the level two caches and the main memory system, the first bus allowing data to be written directly between the level two caches without accessing the main memory system, and a second bus connected to the main memory system.

22. The computer system of claim 21 further comprising peripheral devices connected to the second bus.

23. The computer system of claim 22 wherein the peripheral devices can access the main memory system while an item of data is being written between the level two caches.

* * * * *